(12) United States Patent
Jokela

(10) Patent No.: US 12,116,221 B2
(45) Date of Patent: Oct. 15, 2024

(54) PUMPING APPARATUS

(71) Applicant: IMERTECH SAS, Paris (FR)

(72) Inventor: Morgan Jokela, Lidkoping (SE)

( * ) Notice: Subject to any disclaimer, the term of this patent is extended or adjusted under 35 U.S.C. 154(b) by 0 days.

(21) Appl. No.: 17/906,350

(22) PCT Filed: Mar. 19, 2021

(86) PCT No.: PCT/EP2021/057144
§ 371 (c)(1),
(2) Date: Sep. 15, 2022

(87) PCT Pub. No.: WO2021/186064
PCT Pub. Date: Sep. 23, 2021

(65) Prior Publication Data
US 2023/0115648 A1    Apr. 13, 2023

(30) Foreign Application Priority Data

Mar. 19, 2020  (EP) .................................... 20305285

(51) Int. Cl.
*F04B 15/02*     (2006.01)
*B65G 53/42*    (2006.01)
*B65G 53/46*    (2006.01)

(52) U.S. Cl.
CPC ......... *B65G 53/4675* (2013.01); *B65G 53/42* (2013.01); *B65G 2201/042* (2013.01)

(58) Field of Classification Search
None
See application file for complete search history.

(56) References Cited

U.S. PATENT DOCUMENTS 1,957,224 A * 5/1934 Neuman ................ B65G 53/00
                                                                200/81.9 R
2,035,410 A * 3/1936 Smith ................ B65G 53/4691
                                                                406/169
(Continued)

FOREIGN PATENT DOCUMENTS

CN         1405533 A     3/2003
CN       108502549 A     9/2018
(Continued)

OTHER PUBLICATIONS

International Search Report and Written Opinion dated Jun. 11, 2021, in International Application No. PCT/EP2020/057144.

(Continued)

*Primary Examiner* — Joseph A Dillon, Jr.
(74) *Attorney, Agent, or Firm* — KUSNER & JAFFE

(57) ABSTRACT

Pumping apparatus comprises a granular material pump assembly and a distributor having a distribution end for distributing granular material. The granular material pump assembly is configured to pump granular material through the distributor towards the distribution end. The distributor is configured to permit granular material to exit the distributor at the distribution end when an amount of granular material pumped towards the distribution end exceeds a threshold, for example wherein the distributor comprises a valve assembly configured to permit granular material to exit the distributor at the distribution end when the amount of granular material pumped towards the distribution end exceeds the threshold, optionally wherein the valve assembly comprises a valve configured to open to permit granular material to exit the distributor at the distribution end when the amount of granular material pumped towards the distribution end exceeds the threshold.

18 Claims, 11 Drawing Sheets

(56) References Cited

U.S. PATENT DOCUMENTS

| | | | | |
|---|---|---|---|---|
| 2,355,774 | A * | 8/1944 | Baker | B65G 53/08 |
| | | | | 406/60 |
| 2,754,155 | A * | 7/1956 | Kempthorne et al. | |
| | | | | B65G 53/526 |
| | | | | 19/66 CC |
| 2,890,081 | A * | 6/1959 | Terrett | B65G 53/4675 |
| | | | | 55/432 |
| 2,907,605 | A * | 10/1959 | Brooks | B01F 35/711 |
| | | | | 406/192 |
| 2,992,858 | A * | 7/1961 | Pendleton | B65G 53/66 |
| | | | | 406/171 |
| 3,301,604 | A * | 1/1967 | Berry | B65G 53/22 |
| | | | | 406/137 |
| 3,429,108 | A | 2/1969 | Larson | |
| 4,067,622 | A * | 1/1978 | Krambrock | B65G 53/521 |
| | | | | 406/85 |
| 4,846,608 | A * | 7/1989 | Sanders | B65G 53/14 |
| | | | | 406/173 |
| 5,102,585 | A * | 4/1992 | Pieper | A61F 13/15658 |
| | | | | 264/518 |
| 5,252,037 | A * | 10/1993 | Carlson | F04B 11/0058 |
| | | | | 452/42 |
| 6,068,429 | A * | 5/2000 | Schultheis | B65G 53/60 |
| | | | | 406/172 |
| 6,325,572 | B1 * | 12/2001 | Dietrich | B65G 53/24 |
| | | | | 406/146 |
| 6,379,086 | B1 * | 4/2002 | Goth | B29C 48/285 |
| | | | | 406/75 |
| 6,394,708 | B1 * | 5/2002 | Braden | B65G 53/60 |
| | | | | 406/173 |
| 6,413,020 | B1 * | 7/2002 | Davison | B65G 53/66 |
| | | | | 406/34 |
| 6,634,833 | B2 * | 10/2003 | Gillespie | B65G 53/58 |
| | | | | 406/84 |
| 6,817,837 | B2 * | 11/2004 | Hutchinson | F04F 3/00 |
| | | | | 417/174 |
| 6,877,933 | B2 * | 4/2005 | Ho | B29C 31/02 |
| | | | | 406/84 |
| 7,080,960 | B2 * | 7/2006 | Burnett | E21B 21/065 |
| | | | | 406/33 |
| 7,228,990 | B2 * | 6/2007 | Schmidt | E04C 5/076 |
| | | | | 406/33 |
| 7,896,584 | B2 * | 3/2011 | Sundholm | B65G 53/24 |
| | | | | 406/48 |
| 8,087,851 | B1 * | 1/2012 | Jarvis | B65G 53/34 |
| | | | | 406/137 |
| 8,113,745 | B2 * | 2/2012 | Aoki | B65G 53/525 |
| | | | | 406/197 |
| 8,360,691 | B2 * | 1/2013 | Moretto | B65G 53/24 |
| | | | | 406/122 |
| 8,905,681 | B2 * | 12/2014 | Schneider | B65G 53/06 |
| | | | | 406/173 |
| 9,174,812 | B2 * | 11/2015 | Harris | B65G 53/60 |
| 9,533,839 | B2 * | 1/2017 | Nierescher | B65G 53/14 |
| 9,708,138 | B2 * | 7/2017 | Veselov | B65G 53/46 |
| 10,138,077 | B2 * | 11/2018 | Ellis | B65G 53/4691 |
| 10,495,304 | B2 * | 12/2019 | Boer | F27D 1/0006 |
| 10,647,527 | B2 * | 5/2020 | Stark | B65G 53/10 |
| 10,815,078 | B2 | 10/2020 | Stark et al. | |
| 11,091,327 | B2 * | 8/2021 | Kelly | B65G 53/04 |
| 11,365,071 | B2 * | 6/2022 | Brewster | B65G 53/24 |
| 2014/0270994 | A1 * | 9/2014 | Gualtieri | B05C 19/06 |
| | | | | 406/82 |
| 2015/0110565 | A1 * | 4/2015 | Harris | B65G 69/182 |
| | | | | 406/144 |
| 2020/0331710 | A1 * | 10/2020 | Blanc | B65G 47/265 |

FOREIGN PATENT DOCUMENTS

| | | | | |
|---|---|---|---|---|
| CN | 209956956 U | | 1/2020 | |
| DE | 4216505 A1 * | 11/1993 | | B65G 53/00 |
| JP | 64002931 A * | 1/1989 | | |
| JP | 2004122072 A * | 4/2004 | | |

OTHER PUBLICATIONS

Office Action (with English translation) issued May 27, 2024 from related/corresponding Chinese Patent Appl. No. 202180021653.6.

* cited by examiner

PUMPING APPARATUS

CLAIM FOR PRIORITY

This application is a U.S. national phase entry under 35 U.S.C. § 371 from PCT International Application No. PCT/EP2021/057144, filed Mar. 19, 2021, which claims the benefit of priority of European Patent Application No. 20305285.7, filed Mar. 19, 2020, from both of which this application claims priority and both of which are incorporated herein by reference.

FIELD

The present disclosure concerns pumping apparatus, granular material feeders and associated methods.

BACKGROUND

Granular materials may be moved from one location to another using pumping apparatus. For example, pumping apparatus may be used to distribute granular refractory materials when lining the walls of a furnace. Other types of granular materials which may be moved or distributed using pumping apparatus include mineral powders, cement, sand, soil, pharmaceutical products and food products (for example, flour, grain or coffee beans). However, there are difficulties associated with moving dry granular materials using pumping apparatus. For example, pumped granular material exiting pumping apparatus may generate large volumes of dust. Dependent on the granular material being pumped, the dust generated may be explosive, toxic, or difficult to recover or clean up.

SUMMARY

According to a first aspect, there is provided pumping apparatus comprising a granular material pump assembly and a distributor having a distribution end for distributing granular material. The granular material pump assembly is configured to pump granular material through the distributor towards the distribution end (e.g. for distribution at the distribution end). The distributor is configured to permit granular material to exit the distributor at the distribution end when an amount of granular material pumped towards the distribution end exceeds a threshold (i.e. responsive to the amount of granular material pumped towards the distribution end exceeding the threshold). For example, it may be that the distributor comprises a valve assembly configured to permit granular material to exit the distributor at the distribution end when the amount of granular material pumped towards the distribution end exceeds the threshold (i.e. responsive to the amount of granular material pumped towards the distribution end exceeding the threshold). It may be that the valve assembly comprises a valve configured to open to permit granular material to exit the distributor at the distribution end (e.g. for distribution) when the amount of granular material pumped towards the distribution end exceeds the threshold (i.e. responsive to the amount of granular material pumped towards the distribution end exceeding the threshold).

The distributor is configured to permit granular material to exit the distributor at the distribution end when the amount of granular material pumped towards the distribution end exceeds the threshold (e.g. the valve is configured to open to permit granular material to exit the distributor at the distribution end when the amount of granular material pumped towards the distribution end exceeds the threshold (i.e. responsive to the amount of granular material pumped towards the distribution end exceeding the threshold)). Flow of granular material out of the distributor at the distribution end may therefore be generally discontinuous and not generally continuous. The inventors have found that a discontinuous flow of granular material out of the distributor at the distribution end can lead to a reduction in dust generation when the granular material is being distributed. However, in some embodiments, the distributor (e.g. the valve assembly, for example the valve) may be configured such that the flow of granular material out of the distributor at the distribution end is generally continuous.

It will be appreciated that a granular material is a collection of particles of solid material which are not bonded to one another. The particle are therefore able to move relative to one another, i.e. to flow under the action of applied forces. The particles may have characteristic dimensions on the nanometre scale, micrometre scale, millimetre scale or centimetre scale. For example, each particle may have a characteristic dimension (e.g. an average particle diameter) no less than about 1 nm, for example, no less than about 10 nm, or no less than about 100 nm, or no less than about 1 µm, or no less than about 10 µm, or no less than about 100 µm. Each particle may have a characteristic dimension (e.g. average particle diameter) no greater than about 1 cm, for example, no greater than about 1 mm, or no greater than about 100 µm. Each particle may have a characteristic dimension (e.g. average particle diameter) from about 1 nm to about 1 cm, for example from about 10 nm to about 1 cm, or from about 100 nm to about 1 cm, or from about 1 µm to about 1 cm, or from about 10 µm to about 1 cm, or from about 100 µm to about 1 cm, or from about 1 nm to about 1 mm, or from about 1 nm to about 100 µm, or from about 1 nm to about 10 µm, or from about 1 nm to about 100 nm, or from about 1 nm to about 10 nm, or from about 10 nm to about 1 mm, or from about 100 nm to about 1 mm, or from about 10 nm to about 100 µm, or from about 100 nm to about 100 µm, or from about 10 µm to about 1 cm, or from about 100 µm to about 1 cm, or from about 10 µm to about 1 mm, or from about 100 µm to about 1 mm. Granular materials therefore include powders.

The granular material may have a bulk density of no less than about 0.1 t/m$^3$ (wherein "t" is a metric tonne, i.e. 1000 kg), for example, no less than about 0.5 t/m$^3$, or no less than about 1.0 t/m$^3$, or no less than about 1.5 t/m$^3$, or no less than about 1.6 t/m$^3$, or no less than about 1.7 t/m$^3$, or no less than about 1.8 t/m$^3$, or no less than about 1.9 t/m$^3$, or no less than about 2.0 t/m$^3$, or no less than about 2.1 t/m$^3$, or no less than about 2.2 t/m$^3$. The granular material may have a bulk density of no more than about 3.2 t/m$^3$, for example, no more than about 3.1 t/m$^3$, or no more than about 3.0 t/m$^3$, or no more than about 2.9 t/m$^3$, or no more than about 2.8 t/m$^3$, or no more than about 2.7 t/m$^3$, or no more than about 2.5 t/m$^3$, or no more than about 2.4 t/m$^3$, or no more than about 2.3 t/m$^3$, or no more than about 2.2 t/m$^3$. The granular material may have a bulk density from about 0.1 t/m$^3$ to about 3.2 t/m$^3$, for example, from about 0.5 t/m$^3$ to about 3.2 t/m$^3$, or from about 1.0 t/m$^3$ to about 3.2 t/m$^3$, or from about 1.5 t/m$^3$ to about 3.2 t/m$^3$, or from about 1.6 t/m$^3$ to about 3.1 t/m$^3$, or from about 1.7 t/m$^3$ to about 3.0 t/m$^3$, or from about 1.8 t/m$^3$ to about 2.9 t/m$^3$, or from about 1.9 t/m$^3$ to about 2.8 t/m$^3$, or from about 2.0 t/m$^3$ to about 2.7 t/m$^3$, or from about 2.1 t/m$^3$ to about 2.6 t/m$^3$, or from about 2.1 t/m$^3$ to about 2.5 t/m$^3$, or from about 2.1 t/m$^3$ to about 2.4 t/m$^3$, or from about 2.1 t/m$^3$ to about 2.3 t/m$^3$, for example about 2.2 t/m$^3$.

The pumping apparatus may be particularly suitable for pumping dry granular materials. It will be appreciated that a dry granular material is not necessarily 100% moisture-free. For example, some or all of the particles of the dry granular material may contain some moisture such as water. However, a dry granular material is not wet in the sense that spaces between the particles of solid material in the granular material are not filled with liquid but are instead typically filled with gas. A dry granular material can be contrasted with a wet granular material such as a suspension of a granular material or a slurry. Dust is more likely to be generated when pumping or distributing a dry granular material in comparison to a wet granular material such as a suspension or slurry. Accordingly, the granular material pump assembly may be a dry granular material pump assembly configured to pump dry granular material through the distributor towards the distribution end. The valve may be configured to open to permit dry granular material to exit the distributor at the distribution end when an amount of dry granular material pumped towards the distribution end exceeds a threshold (i.e. responsive to the amount of dry granular material pumped towards the distribution end exceeding the threshold).

The granular material may comprise (e.g. be) one or more of the following: a granular refractory material (e.g. comprising or being alumina, silica (e.g. quartz), magnesia, calcium oxide and/or calcium hydroxide (e.g. lime), and/or zirconia), a mineral powder (e.g. comprising or being quartz, quartzite, calcium carbonate, calcite, one or more clay minerals (such as talc, kaolinite, bentonite, etc.), wollastonite, perlite, mica, diatomaceous earth, etc.), cement, sand, soil, a pharmaceutical product, and/or a food product (e.g. flour, grain (e.g. cereal grain) or coffee beans).

It may be that the valve is configured to open automatically when the amount of granular material pumped towards the distribution end exceeds the threshold (i.e. responsive to the amount of granular material pumped towards the distribution end exceeding the threshold).

It may be that the valve is configured to open to permit granular material to exit the distributor at the distribution end when a volume of granular material pumped towards the distribution end exceeds a threshold (i.e. responsive to the volume of granular material pumped towards the distribution end exceeding the threshold). Alternatively, it may be that the valve is configured to open to permit granular material to exit the distributor at the distribution end when a mass of granular material pumped towards the distribution end exceeds a threshold (i.e. responsive to the mass of granular material pumped towards the distribution end exceeding the threshold).

It may be that the valve is configured to open to permit granular material to exit the distributor at the distribution end when the amount (e.g. volume or mass) of granular material within a region of the distributor exceeds a threshold (i.e. responsive the amount (e.g. volume or mass) of granular material within the region exceeding the threshold). The region may be immediately upstream of the valve.

It may be that the valve is configured to open to permit granular material to exit the distributor at the distribution end when the amount (e.g. volume or mass) of granular material within a packet (e.g. a volume packet) of granular material pumped towards the distribution end exceeds a threshold (i.e. responsive to the amount (e.g. volume or mass) of granular material within the packet (e.g. volume packet) of granular material pumped towards the distribution end exceeding the threshold). The bounds (i.e. the extent or size) of the packet (e.g. volume packet) of granular material may be defined by the density of granular material in the distributor as a function of distance along the distributor at a given time, for example wherein the packet (e.g. volume packet) of granular material at a given time corresponds to a region within the distributor in which the density of granular material is high, the packet (e.g. volume packet) of granular material being bounded on either side within the distributor by regions in which the density of granular material is low (e.g. regions which are substantially granular material-free). For example, the granular material pump assembly may be configured to pump a plurality of packets (e.g. volume packets) of granular material through the distributor, wherein each of the plurality of packets (e.g. volume packets) of granular material are spaced apart from one another by regions which are substantially granular material-free (e.g. regions predominantly consisting of gas), and the valve may be configured to open to permit granular material to exit the distributor at the distribution end when the amount (e.g. volume or mass) of granular material within a packet (e.g. volume packet) of the plurality of packets (e.g. volume packets), for example within a particular region of the distributor, exceeds the threshold (i.e. responsive to the amount (e.g. volume or mass) of granular material within a packet (e.g. volume packet) of the plurality of packets (e.g. volume packets), for example within a particular region of the distributor, exceeding the threshold).

It may be that the granular material pump assembly comprises a granular material feeder for regulating a flow of granular material into the distributor and a gas flow generator for pumping the flow of granular material through the distributor. For example, it may be that the granular material feeder is configured to regulate the flow of granular material into the distributor and the gas flow generator is configured to generate a flow of gas (e.g. air) which pushes the granular material along the distributor towards the distribution end, thereby pumping the granular material through the distributor.

The granular material feeder may be operable to generate a discontinuous flow of granular material into the distributor. Additionally or alternatively, the granular material feeder may be operable to generate a continuous flow of granular material into the distributor. For example, the granular material feeder may be a discontinuous feeder operable to generate a discontinuous flow of granular material into the distributor, a continuous feeder operable to generate a continuous flow of granular material into the distributor, or a granular material feeder operable to generate a discontinuous flow or a continuous flow of granular material into the distributor dependent on its configuration (for example, dependent on a setting selected by a user). It may be that the granular material feeder is a discontinuous feeder (i.e. a discontinuous granular material feeder) configured to generate a discontinuous flow of granular material into the distributor. For example, the discontinuous feeder may be configured to (e.g. periodically) vary the rate at which granular material is fed into the distributor. The discontinuous feeder may be a granular material feeder according to the second aspect as described in more detail hereinbelow.

It may be that the granular material pump assembly is configured to pump discrete volumes (i.e. packets) of granular material through the distributor towards the distribution end, the discrete volumes of granular material being spaced apart from one another within the distributor (e.g. by volumes of gas which are substantially granular material-free, i.e. having negligible granular material content). For example, it may be that the discontinuous feeder is configured to feed discrete volumes (i.e. packets) of granular material into the distributor and the gas flow generator is configured to generate a flow of gas (e.g. air) which pushes the discrete volumes (i.e. packets) of granular material along the distributor spaced apart from one another, thereby pumping the discrete volumes (i.e. packets) of granular material through the distributor towards the distribution end. It may be that discontinuous feeder is configured to feed one discrete volume (i.e. packet) of granular material into the distributor at a rate of no greater than about 5 discrete volumes (i.e. packets) per second, for example, no greater than about 3 discrete volumes (i.e. packets) per second, or no greater than about 2 discrete volumes (i.e. packets) per second, or no greater than about 1 discrete volume (i.e. packets) per second. It may be that the discontinuous feeder is configured to feed one discrete volume (i.e. packet) of granular material into the distributor at a rate of no less than about 0.1 discrete volumes (i.e. packets) per second, for example, no less than about 0.2 discrete volumes (i.e. packets) per second, for no less than about 0.5 discrete volumes (i.e. packets) per second. It may be that discontinuous feeder is configured to feed one discrete volume (i.e. packet) of granular material into the distributor at a rate from about 0.1 discrete volumes (i.e. packets) per second to about 5 discrete volumes (i.e. packets) per second, for example, from about 0.2 discrete volumes (i.e. packets) per second to about 3 discrete volumes (i.e. packets) per second, or from about 0.2 discrete volumes (i.e. packets) per second to about 3 discrete volumes (i.e. packets) per second, or from about 0.5 discrete volumes (i.e. packets) per second to about 2 discrete volumes (i.e. packets) per second, or from about 0.5 discrete volumes (i.e. packets) per second to about 1 discrete volumes (i.e. packets) per second, for example about 0.8 discrete volumes (i.e. packets) per second (e.g. about 1 discrete volume (i.e. packet) every 1.3 seconds).

It may be that: the granular material pump assembly is configured to pump discrete volumes (i.e. packets) of granular material through the distributor towards the distribution end, the discrete volumes of granular material being spaced apart from one another within the distributor (e.g. by volumes of which substantially granular material-free, i.e. having negligible granular material content); and the valve is configured to open to permit granular material to exit the distributor at the distribution end when the amount (e.g. volume or mass) of granular material within a region of the distributor exceeds a threshold (i.e. responsive to the amount (e.g. volume or mass) of granular material within the region exceeding the threshold), wherein the threshold corresponds to the amount of granular material in each (i.e. a single) discrete volume (i.e. packet) of granular material pumped through the distributer by the granular material pump assembly. Alternatively, it may be that the threshold corresponds to an amount of granular material which is greater than the amount of granular material in each (i.e. single) discrete volume (i.e. packet) of granular material pumped through the distributer by the granular material pump assembly. For example, it may be that the threshold corresponds to an amount of granular material which is greater than the total amount of granular material in two or more, for example three or more, or four or more, or five or more, discrete volumes (i.e. packets) of granular material pumped through the distributer by the granular material pump assembly.

It may be that the granular material pump assembly comprises more than one granular material feeder. For example, it may be that the granular material pump assembly comprises first and second granular material feeders, the first granular material feeder being configured to feed granular material into the second granular material feeder, and the second granular material feeder being configured to feed granular material into the distributor. It may be that the first granular material feeder is a continuous feeder and the second granular material feeder is the discontinuous material feeder.

The gas flow generator may comprise a gas mover such as an air mover. For example, the gas flow generator may comprise a fan or an impeller.

It may be that the distributor comprises a vent configured (e.g. positioned) to vent gas (e.g. air) from the flow of granular material in the distributor. The vent may be configured (e.g. positioned) to vent the gas (e.g. air) from the flow of granular material in the distributor in a vent region. The vent may form part of the valve assembly. The vent region may form part of the valve assembly. For example, it may be that the valve assembly comprises the vent configured (e.g. positioned) to vent gas from the flow of granular material in the distributor in a vent region upstream (e.g. directly upstream) of the valve. It will be appreciated that terms such as "upstream" and "downstream" are defined relative to the flow of granular material along the distributor from the granular material pump assembly towards the distribution end, an upstream location being closer to the granular material pump assembly (or further from the distribution end) than a downstream location.

The pumping apparatus may comprise an extractor (e.g. a pump) to draw gas out of (i.e. extract gas from) the flow of granular material in the distributor by way of (i.e. through) the vent.

It may be that the valve is configured to open to permit granular material to exit the distributor at the distribution end when the amount (e.g. mass or volume) of granular material in the vent region (i.e. upstream (e.g. directly upstream) of the vent) exceeds a threshold (i.e. responsive to the amount (e.g. mass or volume) of granular material in the vent region (i.e. upstream (e.g. directly upstream) of the vent) exceeding the threshold).

The pumping apparatus may be configured to selectively operate the extractor (e.g. pump) and/or selectively open and close the vent so as to vent gas (e.g. air) from the flow of granular material in the distributor when an amount (e.g. volume or mass) of granular material in the vent region is less than a lower threshold (i.e. responsive to the amount (e.g. mass or volume) of granular material in the vent region being less than the lower threshold). Alternatively, the pumping apparatus may be configured to operate the extractor continuously and/or to hold the vent open continuously during operation of the pumping apparatus.

The distributor may comprise an external vent. The external vent may be located proximate, for example at, the distribution end. The pumping apparatus may comprise an external extractor (e.g. an external pump) for drawing gas from outside the distributor at the distribution end through the external vent. Drawing gas from outside the distributor at the distribution end through the external vent may capture dust which is generated at the distribution end as granular material is distributed. The extractor (for drawing gas out of the flow of granular material in the distributor by way of the vent) may function as the external extractor.

It may be that the valve is biased towards a closed configuration in which passage of granular material therethrough is restricted (e.g. prevented). Additionally, it may be that the valve is configured to open against the bias to permit (e.g. unrestricted) passage of granular material therethrough when the amount (e.g. volume or mass) of granular material pumped towards the distribution end exceeds the threshold (i.e. responsive to the amount (e.g. mass or volume) of granular material pumped towards the distribution end exceeding the threshold). Accordingly, it may be that the valve remains in the closed configuration when the amount (e.g. volume or mass) of granular material pumped towards the distribution end does not exceed (i.e. is less than or equal to) the threshold. For example, in examples in which the granular material pump assembly is configured to pump discrete volumes (i.e. packets) of granular material through the distributor towards the distribution end, the discrete volumes of granular material being spaced apart from one another within the distributor (e.g. by volumes of gas which are substantially granular material-free, i.e. having negligible granular material content), it may be that the valve is configured to open against the bias to permit passage of each discrete volume of granular material therethrough and to return to the closed configuration after each discrete volume of granular material has passed through the valve towards the distribution end. Alternatively, it may be that the valve is configured to open against the bias to permit passage of granular material, corresponding to the amount of granular material in two or more discrete volumes of granular material, therethrough, and to return to the closed configuration after the granular material (i.e. corresponding to the amount of granular material) in two or more discrete volumes of granular material) has passed through the valve towards the distribution end.

It may be that the valve comprises (e.g. corresponds to or consists of) a tube made of a resilient material, the tube being biased closed at a downstream end. The tube may be openable at the downstream end. It may be that tube is configured to open at the downstream end against the bias when the amount (e.g. volume or mass) of granular material pumped towards the distribution end exceeds the threshold (i.e. responsive to the amount (e.g. mass or volume) of granular material pumped towards the distribution end exceeding the threshold). It will be appreciated that the tube typically extends between an upstream end and a downstream end, the downstream end being closer to the distribution end of the distributor than the upstream end is.

It may be that the tube is narrower at the downstream end in the closed configuration than in an open configuration (i.e. than when the valve is open to permit passage of granular material therethrough). For example, it may be that the open cross-sectional area (i.e. through which granular material may flow) of the tube at the downstream end is lower in the closed configuration than in the open configuration. For example, it may be that opposing walls of the tube at the downstream end are closer to one another (for example, sealed against one another) in the closed configuration than in the open configuration. For example, it may be that the tube is (i.e. biased) flattened at the downstream end in the closed configuration.

It may be that the tube does not contain any joins (i.e. between different portions of the tube). For example, the tube may be integrally formed from the resilient material (i.e. as a single piece). For example, the tube may be injection-moulded from the resilient material.

The resilient material may be an elastomeric material such as a rubber, for example a polyurethane-based rubber. The elastomeric material (e.g. rubber, for example polyurethane-based rubber) may be a solid (i.e. non-cellular, e.g. not foamed) material. Alternatively, the elastomeric material (e.g. rubber, for example polyurethane-based rubber) may be a cellular material such as a foamed material (i.e. a foam).

The resilient material (e.g. elastomeric material such as a rubber) may have a density no less than about 30 kg/m$^3$, for example, no less than about 40 kg/m$^3$, or no less than about 50 kg/m$^3$, or no less than about 60 kg/m$^3$. The resilient material (e.g. elastomeric material such as a rubber) may have a density no more than about 70 kg/m$^3$, for example, no more than about 60 kg/m$^3$, or no more than about 50 kg/m$^3$, or no more than about 40 kg/m$^3$. The resilient material (e.g. elastomeric material such as a rubber) may have a density from about 30 kg/m$^3$ to about 70 kg/m$^3$, for example, from about 30 kg/m$^3$ to about 60 kg/m$^3$, or from about 30 kg/m$^3$ to about 50 kg/m$^3$, or from about 30 kg/m$^3$ to about 40 kg/m$^3$, or from about 40 kg/m$^3$ to about 70 kg/m$^3$, or from about 40 kg/m$^3$ to about 60 kg/m$^3$, or from about 40 kg/m$^3$ to about 50 kg/m$^3$, or from about 50 kg/m$^3$ to about 70 kg/m$^3$, or from about 50 kg/m$^3$ to about 60 kg/m$^3$, or from about 60 kg/m$^3$ to about 70 kg/m$^3$.

The resilient material (e.g. elastomeric material such as a rubber) may have a Shore A hardness of no less than about 50, for example, no less than about 60, or no less than about 80. The resilient material (e.g. elastomeric material such as a rubber) may have a Shore A hardness of no more than about 95, for example, no more than about 90, or no more than about 80, or no more than about 70. The resilient material (e.g. elastomeric material such as a rubber) may have a Shore A hardness of from about 50 to about 95, for example, from about 60 to about 95, or from about 70 to about 96, or from about 80 to about 95, or from about 50 to about 90, or from about 60 to about 90, or from about 70 to about 90, or from about 80 to about 90, or from about 50 to about 80, or from about 60 to about 80, or from about 70 to about 80, or from about 50 to about 70, or from about 60 to about 70.

It may be that the threshold (i.e. for opening of the valve against the bias) is (i.e. at least in part) determined by the dimensions of the tube and/or the mechanical properties (e.g. the density and/or the hardness (e.g. Shore A hardness)) of the resilient material. Accordingly, it may be that the dimensions of the tube and/or the mechanical properties of the resilient material are configured (e.g. selected) such that the tube opens at the downstream end against the bias when the amount (e.g. volume or mass) of granular material pumped towards the distribution end exceeds the threshold (i.e. responsive to the amount (e.g. mass or volume) of granular material pumped towards the distribution end exceeding the threshold). In particular, it may be that the dimensions of the tube and/or the mechanical properties of the resilient material are configured (e.g. selected) such that the tube opens at the downstream end against the bias when the weight of granular material pressing against the downstream end of the tube exceeds a threshold (i.e. responsive to the weight of granular material pumped pressing against the downstream end of the tube exceeding the threshold), for example when the tube is (i.e. substantially) vertically oriented such that the downstream end is (i.e. substantially) below an upstream end of the tube.

The skilled person will appreciate that alternative implementations of the valve are possible. For example, the valve may comprise a flap which is biased towards a closed configuration (e.g. closed position) in which passage of granular material through the valve is restricted (e.g. prevented) (for example, by the flap blocking passage of granular material through the valve) and movable to an open configuration (e.g. open position) to permit (e.g. unrestricted) passage of granular material through the valve. The flap may be hingedly attached to a valve wall to permit movement between the closed and open configurations. The flap may be biased towards the closed configuration by a biasing means such as a spring. The flap may be configured to open against the bias to permit (e.g. unrestricted) passage of granular material through the valve (i.e. to move to the open configuration) when the amount (e.g. volume or mass) of granular material pumped towards the distribution end exceeds the threshold (i.e. responsive to the amount (e.g. mass or volume) of granular material pumped towards the distribution end exceeding the threshold). The pumping apparatus may comprise a controller for controlling movement of the flap. The pumping apparatus may comprise one or more sensors operable to determine whether the amount (e.g. volume or mass) of granular material pumped towards the distribution end exceeds the threshold. The controller may be configured (e.g. programmed) to open the valve (i.e. move the flap to the open configuration) in response to an output from the one or more sensors indicating that the amount (e.g. volume or mass) of granular material pumped towards the distribution end exceeds the threshold. Alternatively, the flap may be configured to open under the weight of granular material pressing against the flap, for example when the weight of granular material pressing against the flap exceeds a threshold (for example, determined by the strength of the biasing means).

The valve assembly may be located proximate the distribution end of the distributor. That is to say, the valve assembly may be located closer to the distribution end of the distributor than to the granular material pump assembly. For example, the valve assembly may be located at the distribution end of the distributor.

The distributor may comprise a hose. The hose may be flexible. Additionally, the distributor may comprise a nozzle for distributing the granular material. The nozzle may be located at the distribution end of the distributor, for example at a distribution end of the (e.g. flexible) hose. The (e.g. flexible) hose may connect the nozzle to the granular material pump assembly. The granular material pump assembly may be configured to pump the granular material through the (e.g. flexible) hose towards the nozzle. The nozzle may comprise (e.g. correspond to or be) the valve assembly.

For the avoidance of doubt, the first aspect extends to pumping apparatus comprising a granular material pump assembly and a distributor having a distribution end for distributing granular material, the granular material pump assembly comprising a discontinuous granular material feeder configured to (e.g. periodically) feed discrete volumes (i.e. packets) of granular material into the distributor and a gas flow generator configured to generate a flow of gas (e.g. air) which pushes the discrete volumes (i.e. packets) of granular material along the distributor, the discrete volumes (i.e. packets) of granular material being spaced apart from one another within the distributor by regions of gas (e.g. air) which are substantially free of granular material, wherein the distributor comprises a valve assembly having a valve configured to open to permit granular material to exit the distributor at the distribution end (e.g. for distribution) when a weight of granular material pressing against the valve exceeds a threshold (i.e. responsive to the weight of granular material pressing against the valve exceeding the threshold), for example when the portion of the distributor in which the valve assembly is located is oriented (i.e. substantially) vertically, and a vent configured (e.g. positioned) to vent gas (e.g. air) from the flow of granular material in the distributor in a vent region directly upstream of the valve, wherein the pumping apparatus comprises an extractor (e.g. a pump) to draw gas out of (i.e. extract gas from) the flow of granular material in the distributor by way of (i.e. through) the vent. It may be that the valve comprises (e.g. corresponds to or consists of) a tube made of a resilient material, the tube being biased closed at a downstream end. It may be that the dimensions of the tube and/or the mechanical properties of the resilient material are configured (e.g. selected) such that the tube opens at the downstream end against the bias when the weight of granular material pressing against the downstream end of the tube exceeds the threshold (i.e. responsive to the weight of granular material pressing against the downstream end of the tube exceeding the threshold), for example when the tube is (i.e. substantially) vertically oriented such that the downstream end is (i.e. substantially) below an upstream end of the tube.

In a second aspect, there is provided a granular material feeder operable to generate a discontinuous output flow of granular material and/or a continuous output flow of granular material from an input flow of granular material. The input flow may be a continuous input flow of granular material. The granular material feeder may be operable to generate a discontinuous flow of granular material from a (e.g. continuous) input flow of granular material. Alternatively, the granular material feeder may be operable to generate a continuous flow of granular material from a (e.g. continuous) input flow of granular material. Further alternatively, the granular material feeder may be operable to generate a discontinuous flow or a continuous flow of granular material from a (e.g. continuous) input flow of granular material, for example dependent on the configuration of the granular material feeder (for example, dependent on a setting selected by a user).

In some embodiments, the granular material feeder is configured to generate a discontinuous output flow of granular material from a continuous input flow of granular material.

In embodiments in which the granular material feeder is operable (e.g. configured) to generate a discontinuous output flow of granular material, it may be referred to as a discontinuous granular material feeder or, more simply, a discontinuous feeder.

The granular material feeder may be configured to (e.g. periodically) vary the rate at which granular material is output by the granular material feeder such that the output flow is discontinuous. That is to say, it may be that the granular material feeder is configured to (e.g. periodically) vary the rate at which granular material is output by the granular material feeder such that there are periods during which no granular material is output by the granular material feeder.

It may be that the granular material feeder is configured to output discrete volumes (i.e. packets) of granular material. The discrete volumes (i.e. packets) of granular material may be spaced apart from one another. For example, there may be a delay (i.e. a time delay) between each discrete volume (i.e. packet) of granular material output by the granular material feeder. It may be that each discrete volume (i.e. packet) of granular material output by the granular material contains (i.e. substantially) the same amount (e.g. volume or mass) of granular material. For example, it may be that the granular material feeder is configured to output discrete volumes (i.e. packets) of granular material having (i.e. substantially) the same volume, and it may further be that the discrete volumes (i.e. packets) of granular material have (i.e. substantially) the same mass when the composition of the continuous input flow of granular material is (i.e. substantially) constant (for example, such that the density of the continuous input flow of granular material is (i.e. substantially) constant). The granular material feeder may be configured to output the discrete volumes (i.e. packets) of granular material (i.e. substantially) regularly or periodically, for example such that the time between each discrete volume (i.e. packet) of granular material output by the granular material feeder is (i.e. substantially) the same.

Accordingly, it may be that the discontinuous output flow comprises discrete volumes (i.e. packets) of granular material output periodically by the granular material feeder.

It may be that the discontinuous feeder is configured to output one discrete volume (i.e. packet) of granular material at a rate of no greater than about 5 discrete volumes (i.e. packets) per second, for example, no greater than about 3 discrete volumes (i.e. packets) per second, or no greater than about 2 discrete volumes (i.e. packets) per second, or no greater than about 1 discrete volume (i.e. packets) per second. It may be that discontinuous feeder is configured to output one discrete volume (i.e. packet) of granular material at a rate of no less than about 0.1 discrete volumes (i.e. packets) per second, for example, no less than about 0.2 discrete volumes (i.e. packets) per second, for no less than about 0.5 discrete volumes (i.e. packets) per second. It may be that discontinuous feeder is configured to output one discrete volume (i.e. packet) of granular material at a rate from about 0.1 discrete volumes (i.e. packets) per second to about 5 discrete volumes (i.e. packets) per second, for example, from about 0.2 discrete volumes (i.e. packets) per second to about 3 discrete volumes (i.e. packets) per second, or from about 0.2 discrete volumes (i.e. packets) per second to about 3 discrete volumes (i.e. packets) per second, or from about 0.5 discrete volumes (i.e. packets) per second to about 2 discrete volumes (i.e. packets) per second, or from about 0.5 discrete volumes (i.e. packets) per second to about 1 discrete volumes (i.e. packets) per second, for example about 0.8 discrete volumes (i.e. packets) per second (e.g. about 1 discrete volume (i.e. packet) every 1.3 seconds).

It may be that the discontinuous output flow is generated by periodically (i.e. in a regular, periodic manner) blocking a granular material flow path through the granular material feeder. That is to say, it may be that the discontinuous output flow is generated by periodically blocking and unblocking the granular material flow path, for example such that granular material is output by the granular material feeder when the granular material flow path is not blocked and granular material is not output by the granular material feeder when the granular material flow path is blocked.

The granular material feeder may comprises at least one inlet for receiving the continuous input flow of granular material and at least one outlet for outputting the discontinuous output flow of granular material. The granular material feeder may further comprise a granular material flow conduit movable between: a charging configuration, in which the granular material flow conduit is aligned with an inlet (of the at least one inlet) for receiving granular material; and a discharging configuration, in which the granular material flow conduit is aligned with an outlet (of the at least one outlet) for discharging granular material. The granular material flow conduit is typically out of alignment with the at least one outlet (i.e. any outlet), thereby blocking discharging of granular material through the at least one outlet, when in the charging configuration. The granular material flow conduit is also typically out of alignment with the at least one inlet (i.e. any inlet), thereby blocking charging of the granular material flow conduit with granular material from the at least one inlet, when in the discharging configuration. The granular material feeder may also comprise an actuator configured to drive periodic movement of the granular material flow conduit between the charging and discharging configurations.

In some examples, the granular material feeder comprises two or more granular material flow conduits each being movable between respective charging and discharging configurations with respect to the at least one inlet and the least one outlet. It may be that the actuator is configured to drive periodic movement of the two or more granular material flow conduits between the respective charging and discharging configurations, i.e. such that alternating granular material flow conduits are brought periodically in and out of alignment with the at least one inlet and the at least one outlet.

In some examples, the granular material feeder comprises two or more outlets and two or more granular material flow conduits. It may be that each granular material flow conduit is movable between: a charging configuration, in which the said granular material flow conduit is aligned with an inlet for receiving granular material; and a discharging configuration, in which the said granular material flow conduit is aligned with a respective outlet of the two or more outlets for discharging granular material. Each granular material flow conduit is typically out of alignment with all of the outlets of the two or more outlets, thereby blocking discharging of granular material from the said granular material flow conduit through the outlets, when in the charging configuration. Each granular material flow conduit is also typically out of alignment with the at least one inlet, thereby blocking charging of the said granular material flow conduit with granular material from the at least one inlet, when in the discharging configuration. The granular material feeder may also comprise an actuator configured to drive periodic movement of the granular material flow conduits between respective charging and discharging configurations, i.e. such that alternating granular material flow conduits are brought periodically in and out of alignment with the at least one inlet and respective outlets.

It may be that the granular material flow path through the granular material feeder extends through a granular material flow conduit. Blocking the granular material flow path may comprise disrupting or blocking flow of granular material through the granular material flow conduit. For example, the granular material flow conduit may have at least first and second conduit portions and blocking the granular material flow path may comprise bringing the first and second conduit portions out of alignment with one another and/or positioning a stop (e.g. a wall) between the first and second conduit portions, thereby blocking flow of granular material between the first and second conduit portions (e.g. from the first conduit portion into the second conduit portion, or vice versa). Unblocking the granular material flow path may comprise bringing the first and second conduit portions back into alignment and/or removing the stop (e.g. the wall) from between the first and second conduit portions, thereby unblocking flow of granular material between the first and second conduit portions (e.g. from the first conduit portion into the second conduit portion, or vice versa), i.e. permitting flow of granular material between the first and second conduit portions (e.g. from the first conduit portion into the second conduit portion, or vice versa). The granular material feeder may comprise an actuator (e.g. comprising a motor) configured to drive relative movement of one or more of the first conduit portion, the second conduit portion and/or the stop (e.g. the wall), where present, to cause periodic blocking (and unblocking) of the granular material flow path.

It may be that the granular material feeder comprises an inlet for receiving the continuous input flow of granular material and an outlet for outputting the discontinuous output flow of granular material. The granular material feeder may further comprise a granular material flow conduit movable between a flow configuration (e.g. a flow position), in which the granular material flow conduit is aligned with the inlet and the outlet to thereby permit flow of granular material from the inlet to the outlet through the granular material flow conduit, and a blocked configuration (e.g. a blocked position), in which the granular material flow conduit is positioned out of alignment with the inlet and/or the outlet such that granular material is restricted from flowing from the inlet to the outlet. The granular material feeder may further comprise an actuator (e.g. comprising a motor) configured to drive periodic movement of the granular material flow conduit between the flow and blocked configurations. The periodicity of the discontinuous output (e.g. the size of each discrete volume (i.e. packet) of granular material output by the granular material feeder, and the time delay between each discrete volume (i.e. packet)) may be determined (i.e. set) by the actuator, for example by the periodicity of the movement of the granular material flow conduit.

It may be that the granular material feeder comprises two or more granular material flow conduits each being movable between respective flow and blocked configurations. For example, the two or more granular material flow conduits may each be movable between respective flow and blocked configurations with respect to the same inlet and outlet. It may be that only one of the two or more granular material flow conduits may be in the flow configuration (i.e. aligned with the inlet and the outlet) at a given time. For example, it may be that when one of the two or more granular material flow conduits is in a flow configuration (i.e. such that it is aligned with the inlet and the outlet to thereby permit flow of granular material from the inlet to the outlet through said granular material flow conduit), the others of the two or more granular material flow conduits are in respective blocked configurations (i.e. such that they are out of alignment with the inlet and the outlet). The actuator may be configured to drive periodic movement of the two or more granular material flow conduits between the respective flow and blocked configurations such that alternating granular material flow conduits are brought periodically in and out of alignment with the inlet and the outlet. The periodicity of the discontinuous output (e.g. the size of each discrete volume (i.e. packet) of granular material output by the granular material feeder, and the time delay between each discrete volume (i.e. packet)) may be determined (i.e. set) by the actuator, for example by the timing of the periodic movement of the two or more granular material flow conduits.

In a third aspect, there is provided a pumping apparatus comprising the granular material feeder according to the second aspect. The pumping apparatus may further comprise any features described hereinabove in relation to the first aspect.

In a fourth aspect, there is provided a method comprising using the pumping apparatus according to the first aspect or the third aspect to pump a granular material. The method may comprise distributing the pumping material by way of the distributor, i.e. through the distribution end of the distributor.

The granular material may be a dry granular material.

The granular material may comprise (e.g. be) one or more of the following: a granular refractory material (e.g. comprising or being alumina, silica (e.g. quartz), magnesia, calcium oxide and/or calcium hydroxide (e.g. lime), and/or zirconia), a mineral powder (e.g. comprising or being quartz, quartzite, calcium carbonate, calcite, one or more clay minerals (such as talc, kaolinite, bentonite, etc.), wollastonite, perlite, mica, diatomaceous earth, etc.), cement, sand, soil, a pharmaceutical product, and/or a food product (e.g. flour, grain (e.g. cereal grain) or coffee beans).

The granular material may have a bulk density of no less than about 0.1 $t/m^3$ (wherein "t" is a metric tonne, i.e. 1000 kg), for example, no less than about 0.5 $t/m^3$, or no less than about 1.0 $t/m^3$, or no less than about 1.5 $t/m^3$, or no less than about 1.6 $t/m^3$, or no less than about 1.7 $t/m^3$, or no less than about 1.8 $t/m^3$, or no less than about 1.9 $t/m^3$, or no less than about 2.0 $t/m^3$, or no less than about 2.1 $t/m^3$, or no less than about 2.2 $t/m^3$. The granular material may have a bulk density of no more than about 3.2 $t/m^3$, for example, no more than about 3.1 $t/m^3$, or no more than about 3.0 $t/m^3$, or no more than about 2.9 $t/m^3$, or no more than about 2.8 $t/m^3$, or no more than about 2.7 $t/m^3$, or no more than about 2.5 $t/m^3$, or no more than about 2.4 $t/m^3$, or no more than about 2.3 $t/m^3$, or no more than about 2.2 $t/m^3$. The granular material may have a bulk density from about 0.1 $t/m^3$ to about 3.2 $t/m^3$, for example, from about 0.5 $t/m^3$ to about 3.2 $t/m^3$, or from about 1.0 $t/m^3$ to about 3.2 $t/m^3$, or from about 1.5 $t/m^3$ to about 3.2 $t/m^3$, or from about 1.6 $t/m^3$ to about 3.1 $t/m^3$, or from about 1.7 $t/m^3$ to about 3.0 $t/m^3$, or from about 1.8 $t/m^3$ to about 2.9 $t/m^3$, or from about 1.9 $t/m^3$ to about 2.8 $t/m^3$, or from about 2.0 $t/m^3$ to about 2.7 $t/m^3$, or from about 2.1 $t/m^3$ to about 2.6 $t/m^3$, or from about 2.1 $t/m^3$ to about 2.5 $t/m^3$, or from about 2.1 $t/m^3$ to about 2.4 $t/m^3$, or from about 2.1 $t/m^3$ to about 2.3 $t/m^3$, for example about 2.2 $t/m^3$.

The method may comprise using the pumping apparatus to pump a granular refractory material into a furnace, for example when lining a furnace wall. Accordingly, the method may be a method of lining a furnace wall comprising pumping a granular refractory material using the pumping apparatus.

For the avoidance of doubt, the skilled person will appreciate that, except where mutually exclusive, a feature described in relation to any one of the above aspects may be applied *mutatis mutandis* to any other aspect. Furthermore, except where mutually exclusive, any feature described herein may be applied to any aspect and/or combined with any other feature described herein.

For the avoidance of doubt, the invention extends to the subject-matter defined in the following numbered paragraphs:

1. Pumping apparatus comprising a granular material pump assembly and a distributor having a distribution end for distributing granular material, the granular material pump assembly being configured to pump granular material through the distributor towards the distribution end, wherein the distributor comprises a valve assembly having a valve configured to open to permit granular material to exit the distributor at the distribution end when an amount of granular material pumped towards the distribution end exceeds a threshold.

2. The pumping apparatus according to paragraph 1, wherein the granular material pump assembly comprises a granular material feeder for regulating a flow of granular material into the distributor and a gas flow generator for pumping the flow of granular material through the distributor.

3. The pumping apparatus according to paragraph 2, wherein the valve assembly comprises a vent configured to vent gas from the flow of granular material in the distributor in a vent region upstream of the valve, optionally wherein the pumping apparatus further comprises an extractor to draw gas out of the flow of granular material in the distributor by way of the vent.

4. The pumping apparatus according to paragraph 2 or paragraph 3, wherein the valve is configured to open when the amount of granular material in the vent region exceeds a threshold.

5. The pumping apparatus according to any of paragraphs 2 to 4, wherein the granular material feeder is a discontinuous feeder configured to generate a discontinuous flow of granular material into the distributor.

6. The pumping apparatus according to paragraph 5, wherein the granular material pump assembly is configured to pump discrete volumes of granular material through the distributor towards the distribution end, the discrete volumes of granular material being spaced apart from one another within the distributor.

7. The pumping apparatus according to paragraph 5 or paragraph 6, wherein the granular material pump assembly comprises first and second granular material feeders, the first granular material feeder being a continuous feeder and the second granular material feeder being the discontinuous feeder, wherein the first granular material feeder is configured to feed granular material into the second granular material feeder.

8. The pumping apparatus according to any preceding paragraph, wherein the valve is biased towards a closed configuration in which passage of granular material therethrough is restricted, the valve being configured to open against the bias to permit passage of granular material therethrough when the amount of granular material pumped towards the distribution end exceeds the threshold.

9. The pumping apparatus according to paragraph 8, wherein the valve comprises a tube made of a resilient material, the tube being biased closed at a downstream end.

10. The pumping apparatus according to paragraph 9, wherein the tube is flattened at the downstream end in the closed configuration.

11. The pumping apparatus according to paragraph 9 or paragraph 10, wherein the resilient material is an elastomeric material such as a rubber.

12. The pumping apparatus according to any of paragraphs 9 to 11, wherein the threshold is at least in part determined by the dimensions of the tube and/or the mechanical properties of the resilient material.

13. The pumping apparatus according to any preceding paragraph, wherein the distributor comprises a hose and a nozzle for distributing the granular material, the nozzle being located at the distribution end and optionally comprising the valve assembly.

14. A granular material feeder configured to generate a discontinuous output flow of granular material from a continuous input flow of granular material.

15. The granular material feeder according to paragraph 14, wherein the discontinuous output flow comprises discrete volumes of granular material output periodically by the granular material feeder.

16. The granular material feeder according to paragraph 14 or paragraph 15, wherein the discontinuous output flow is generated by periodically blocking a granular material flow path through the granular material feeder.

17. The granular material feeder according to paragraph 16, wherein the granular material flow path through the granular material feeder extends through a granular material flow conduit having at least first and second conduit portions, and wherein blocking the granular material flow path comprises bringing the first and second conduit portions out of alignment with one another and/or positioning a stop between the first and second conduit portions.

18. The granular material feeder according to paragraph 17 further comprising an actuator configured to drive relative movement of one or more of the first conduit portion, the second conduit portion and the stop to cause periodic blocking of the granular material flow path.

19. The granular material feeder according to paragraph 16, wherein the granular material feeder comprises: an inlet for receiving the continuous input flow of granular material; an outlet for outputting the discontinuous output flow of granular material; a granular material flow conduit movable between a flow configuration, in which the granular material flow conduit is aligned with the inlet and the outlet to thereby permit flow of granular material from the inlet to the outlet through the granular material flow conduit, and a blocked configuration, in which the granular material flow conduit is positioned out of alignment with the inlet and/or the outlet such that granular material is restricted from flowing from the inlet to the outlet; and an actuator configured to drive periodic movement of the granular material flow conduit between the flow and blocked configurations.

20. The granular material feeder according to paragraph 19, wherein the granular material feeder comprises two or more granular material flow conduits each being movable between respective flow and blocked configurations and the actuator is configured to drive periodic movement of the two or more granular material flow conduits between the respective flow and blocked configurations such that alternating granular material flow conduits are brought periodically in and out of alignment with the inlet and the outlet.

21. The granular material feeder according to paragraph 16, wherein the granular material feeder comprises: at least one inlet for receiving the continuous input flow of granular material; at least one outlet for outputting the discontinuous output flow of granular material; a granular material flow conduit movable between: a charging configuration, in which the granular material flow conduit is aligned with an inlet for receiving granular material; and a discharging configuration, in which the granular material flow conduit is aligned with an outlet for discharging granular material; and an actuator configured to drive periodic movement of the granular material flow conduit between the charging and discharging configurations.

22. The granular material feeder according to paragraph 21, wherein the granular material feeder comprises two or more granular material flow conduits each being movable between respective charging and discharging configurations with respect to the at least one inlet and the least one outlet, and wherein the actuator is configured to drive periodic movement of the two or more granular material flow conduits between the respective charging and discharging configurations.

23. A pumping apparatus comprising the granular material feeder according to any of paragraphs 14 to 22.

24. A method comprising using the pumping apparatus according to any of paragraphs 1 to 13 or 23 to pump a granular material such as a granular refractory material.

FIGURES

Embodiments will now be described by way of example only, with reference to the Figures, in which.

DETAILED DESCRIPTION

Figure 1:
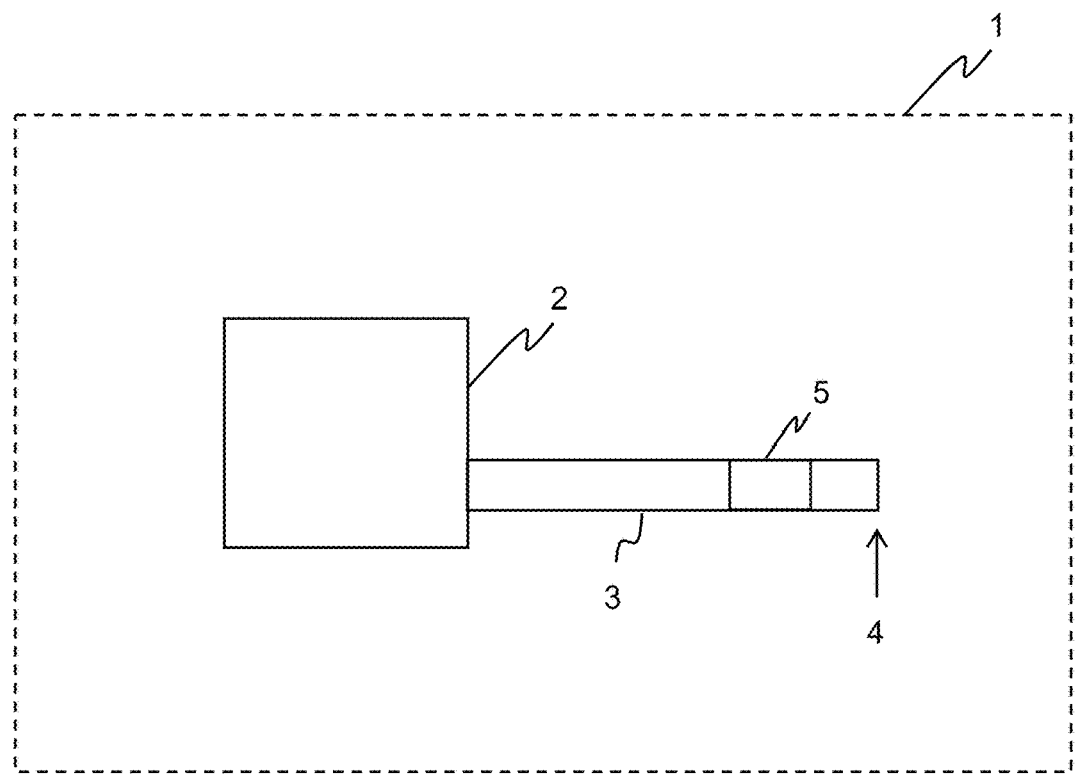
FIG. 1 is a schematic illustration of a first example granular material pumping apparatus.

With reference to FIG. 1, example pumping apparatus 1 comprises a granular material pump assembly 2 and a distributor 3. The distributor 3 is connected to the granular material pump assembly 2 and the granular material pump assembly 2 is operable to pump granular material through the distributor towards a distribution end 4 for distributing the granular material.

The distributor 3 includes a valve 5 for regulating the flow of granular material exiting the distributor 3 at the distribution end 4. In particular, the valve 5 is configured to restrict flow of granular material out of the distributor 3 at the distribution end 4 when an amount of granular material pumped towards the distribution end 4 is less than or below a threshold and to permit flow of granular material out of the distributor 3 at the distribution end 4 when the amount of granular material pumped towards the distribution end 4 exceeds the threshold.

The distributor 3 may include a flexible hose (not shown). The valve 5 may be located at any point along the distributor 3 (e.g. at any point along the hose). However, the valve may preferably be located closer towards, for example at, the distribution end of the distributor 3 (e.g. hose). For example, the distributor 3 may include a nozzle (not shown) at the distribution end for directing an output flow of granular material. The valve 5 may be located in the nozzle or, indeed, may be formed by the nozzle, i.e. the nozzle may function as the valve 5.

Figure 2:
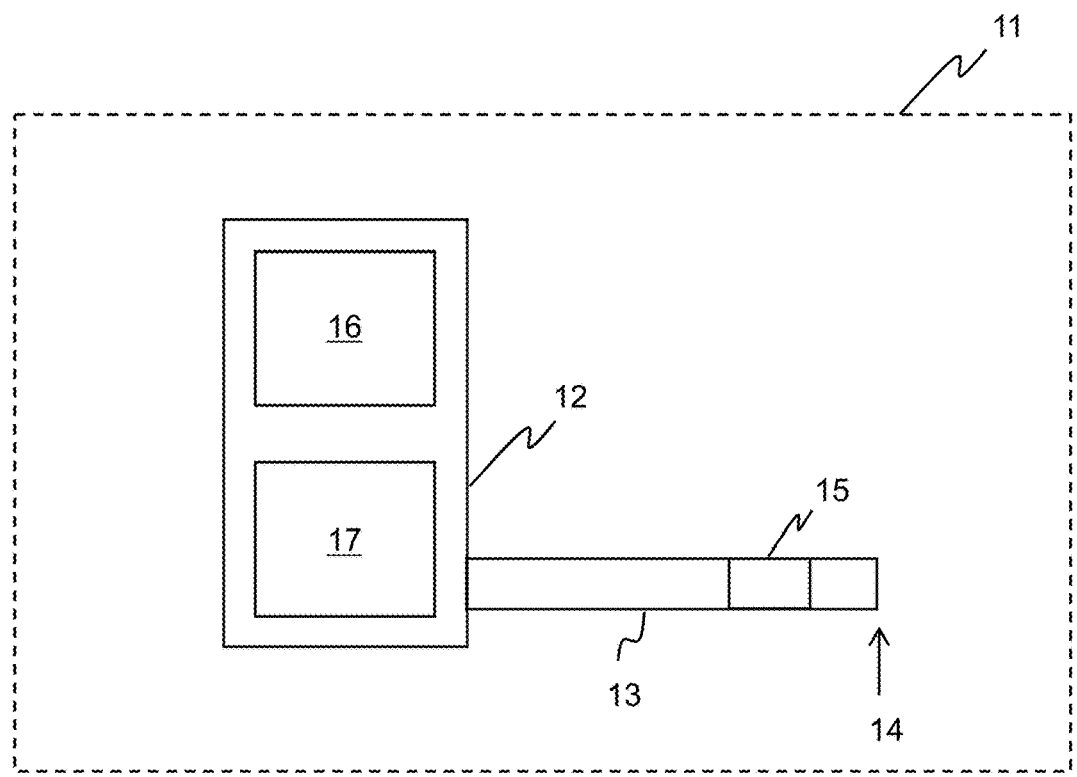
FIG. 2 is a schematic illustration of a second example granular material pumping apparatus.

With reference to FIG. 2, example pumping apparatus 11 comprises a granular material pump assembly 12 and a distributor 13. The distributor 13 is connected to the granular material pump assembly 12 and the granular material pump assembly 12 is operable to pump granular material through the distributor towards a distribution end 14 for distributing the granular material.

The distributor 13 includes a valve 15 for regulating the flow of granular material exiting the distributor 13 at the distribution end 14. In particular, the valve 15 is configured to restrict flow of granular material out of the distributor 13 at the distribution end 14 when an amount of granular material pumped towards the distribution end 14 is less than or below a threshold and to permit flow of granular material out of the distributor 13 at the distribution end 14 when the amount of granular material pumped towards the distribution end 14 exceeds the threshold.

Figure 3:
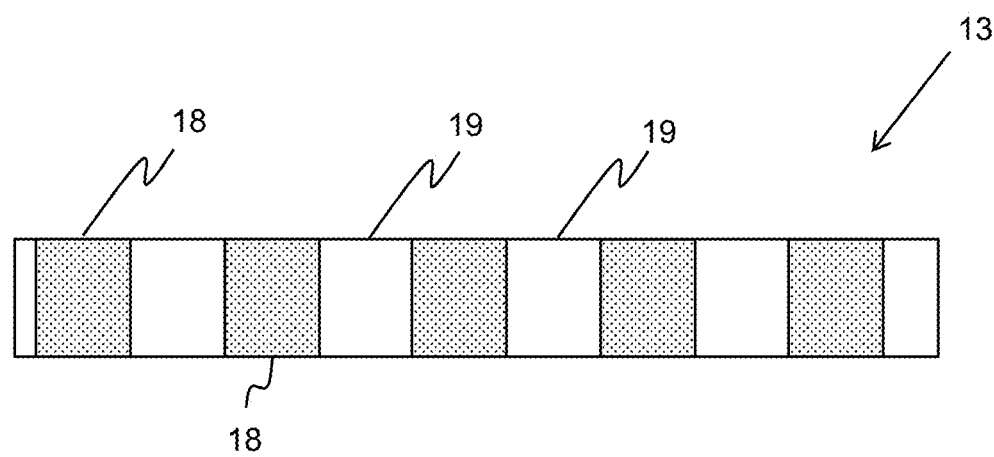
FIG. 3 is a schematic illustration of a discontinuous flow of granular material travelling through a distributor of a granular material pumping apparatus.

In the example shown in FIG. 2, the granular material pump assembly 12 comprises a granular material feeder 16 for regulating a flow of granular material into the distributor 13 and a gas flow generator 17 for pumping the flow of granular material through the distributor 13. In the example shown in FIG. 2, the granular material feeder 16 is a discontinuous feeder for outputting a discontinuous flow of granular material into the distributor 13. The discontinuous flow of granular material output by the discontinuous feeder 16 consists of a series of discrete volumes (i.e. packets) of granular material output periodically by the granular material feeder 16 and pumped along the distributor 13 by the gas flow generator 17. For example, FIG. 3 illustrates a discontinuous flow of granular material travelling along a portion of the distributor 13. Discrete volumes of granular material 18 (shaded in FIG. 5) are spaced apart from one another within the distributor by gas-filled regions 19 (unshaded in FIG. 5) substantially devoid of granular material.

The gas flow generator 14 may be of any suitable type known in the art. For example, the gas flow generator 14 may comprise a fan or impeller for generating a flow of gas. The flow of gas may be a flow of air.

Figure 4:
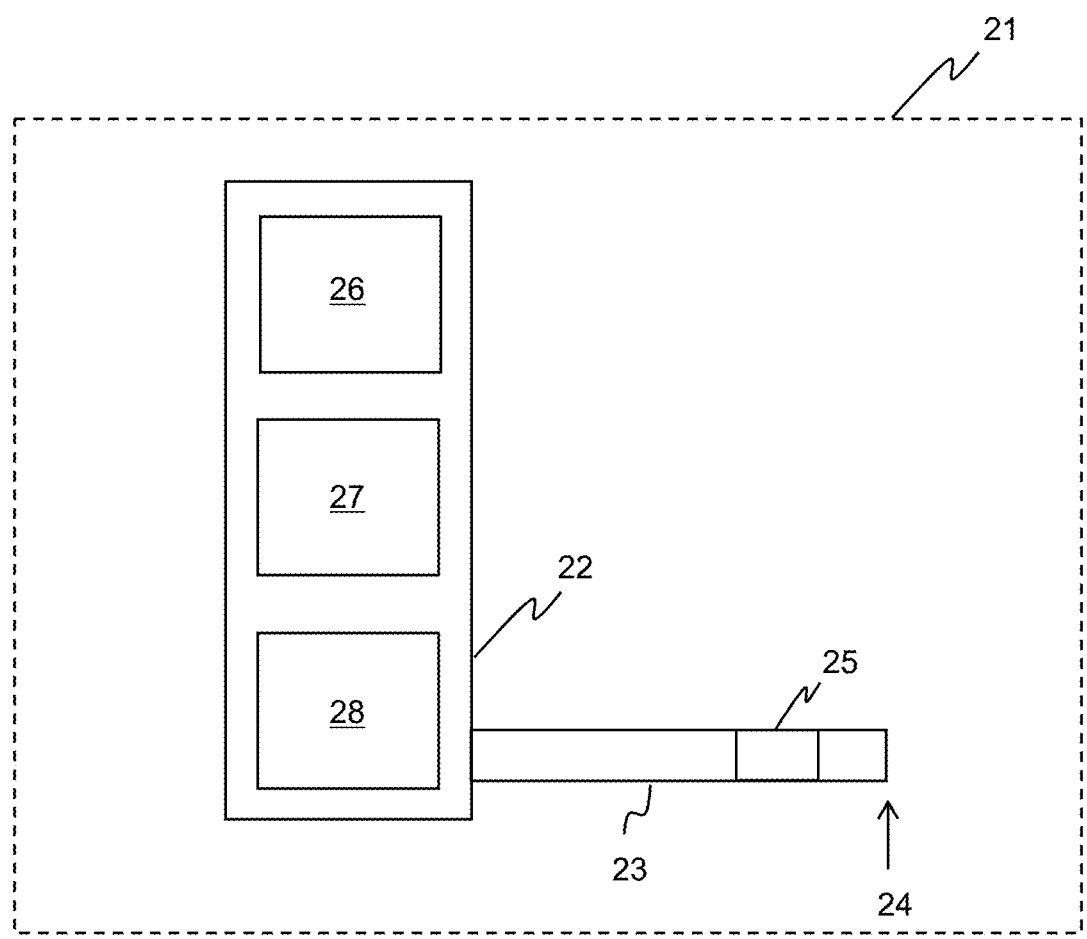
FIG. 4 is a schematic illustration of a third example granular material pumping apparatus.

With reference to FIG. 4, example pumping apparatus 21 comprises a granular material pump assembly 22 and a distributor 23. The distributor 23 is connected to the granular material pump assembly 22 and the granular material pump assembly 22 is operable to pump granular material through the distributor towards a distribution end 24 for distributing the granular material.

The distributor 23 includes a valve 25 for regulating the flow of granular material exiting the distributor 23 at the distribution end 24. In particular, the valve 25 is configured to restrict flow of granular material out of the distributor 23 at the distribution end 24 when an amount of granular material pumped towards the distribution end 24 is less than or below a threshold and to permit flow of granular material out of the distributor 23 at the distribution end 24 when the amount of granular material pumped towards the distribution end 24 exceeds the threshold.

The granular material pump assembly 22 comprises a first granular material feeder 26, a second granular material feeder 27 and a gas flow generator 28. In the example shown in FIG. 4, the first granular material feeder 26 is a continuous feeder for outputting a continuous flow of granular material into the second granular material feeder 27. The second granular material feeder 27 is a discontinuous feeder for output a discontinuous flow of granular material into the distributor 23.

As discussed hereinabove, each of the example pumping apparatus 1, 11 and 21 comprises a valve 5, 15 or 25 configured to selectively restrict or permit flow of granular material out of the corresponding distributor 3, 13 or 13 dependent on the amount of granular material pumped towards the respective distribution end 4, 14 or 24. In each example, the distributor may also include a vent for venting gas (e.g. air) from the flow of granular material in the distributor in a vent region upstream of the valve. The distributor may also include an extractor to draw gas (e.g. air) out of the flow of granular material in the distributor by way of the vent.

Figure 5:
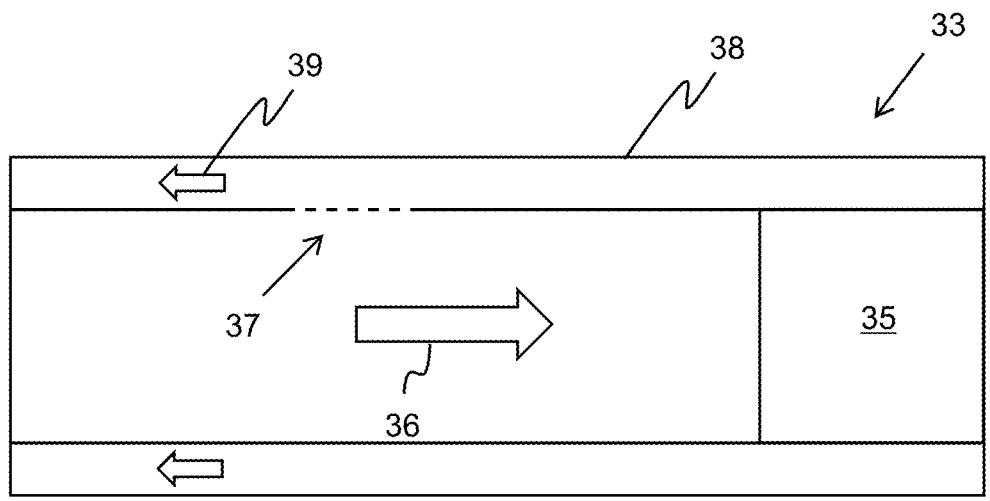
FIG. 5 is a schematic cross-sectional view of a distributor of a granular material pumping apparatus.

For example, FIG. 5 shows a portion of an example distributor 33 comprising a valve 35. The valve 35 is configured to selectively restrict or permit flow of granular material therethrough dependent on the amount of granular material being pumped towards the valve 35 (i.e. in the direction indicated by arrow 36). The distributor 33 also includes a vent 37 through which an extractor 38 draws gas (e.g. air) out of the flow of granular material in the distributor (in the direction indicated by arrow 39). Because gas (e.g. air) is drawn out of the flow of granular material in the vent region upstream of the valve, the gas (e.g. air) pressure upstream of the valve is reduced. Typically, the extractor 38 is operated such that gas (e.g. air) is removed from the distributor upstream of the valve at a rate so as to counteract the gas (e.g. air) pressure caused by operation of the gas flow generator. Accordingly, the granular material is not forced against the valve by the gas (e.g. air) flow. Therefore, when the valve opens (when the amount of granular material immediately upstream of the valve exceeds the threshold, granular material falls out of the distribution through the valve under the influence of gravity, rather than being blown out of the distributor by the action of the gas (e.g. air) flow, particularly when the distributor is held in a substantially vertical orientation such that the distribution end is substantially vertically below immediately upstream portions of the distributor. The inventors have found that this leads to a significant reduction in the amount of dust generated when distributing the granular material.

Figure 6:
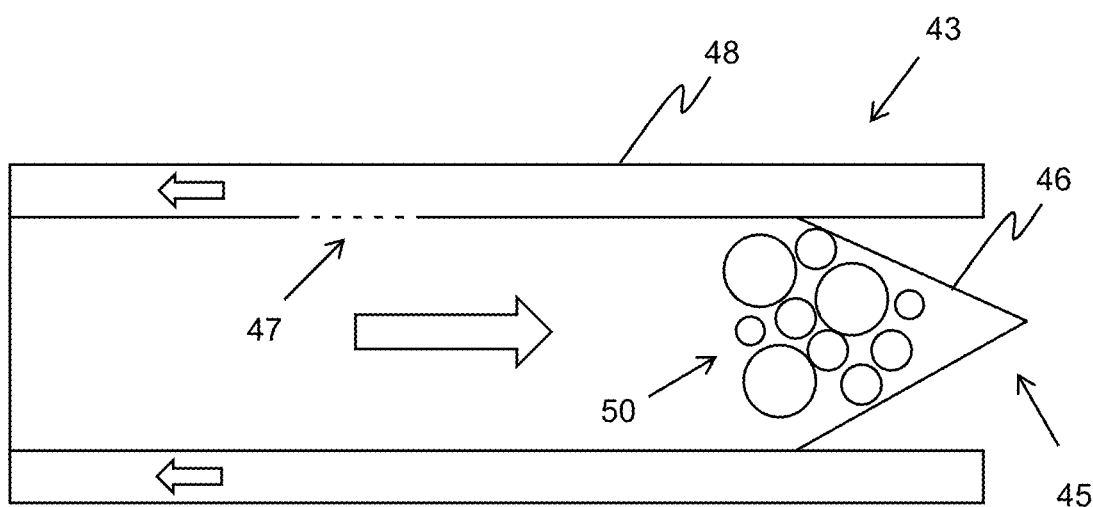
FIG. 6 is a schematic cross-sectional view of a distributor of a granular material pumping apparatus in which a valve is in a closed configuration.
Figure 7:
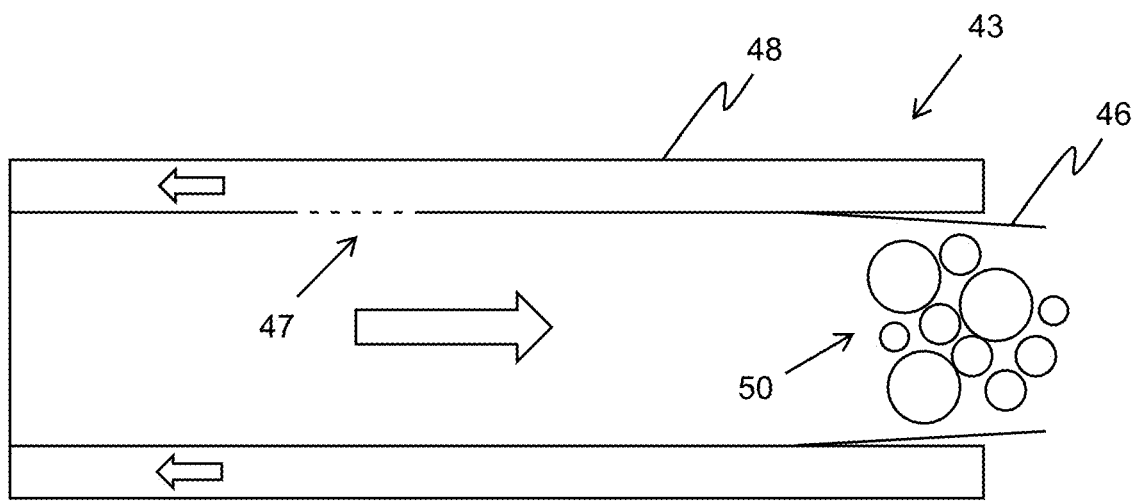
FIG. 7 is a schematic cross-section view of the distributor of FIG. 6 in which the valve is in an open configuration.
Figure 8:
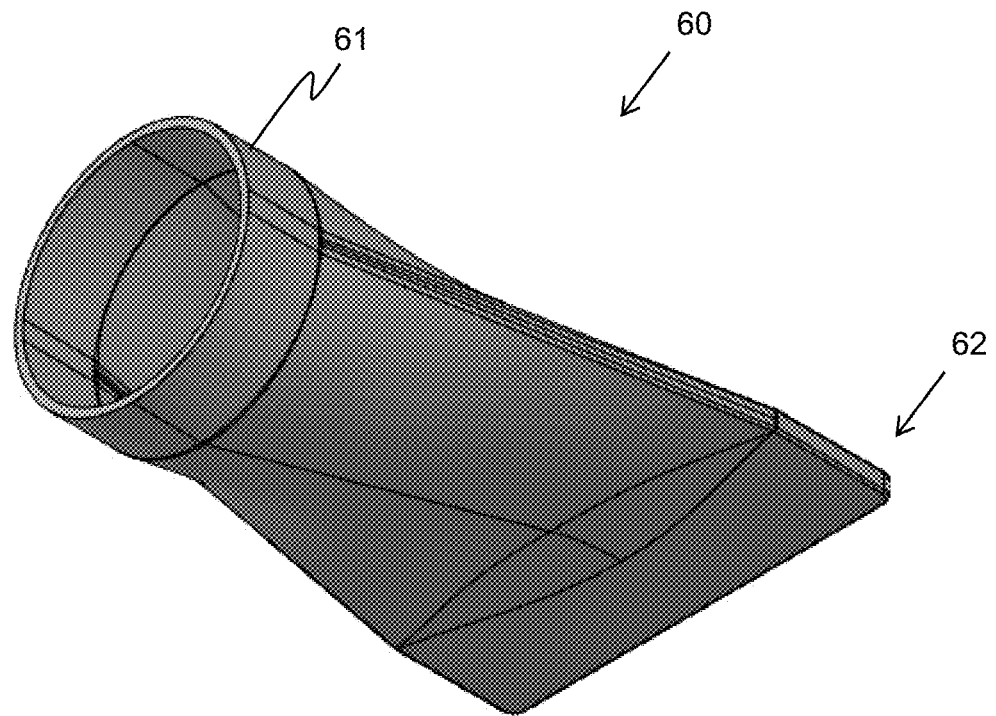
FIG. 8 is a perspective view of an example valve for a distributor of a granular material pumping apparatus.
Figure 9:
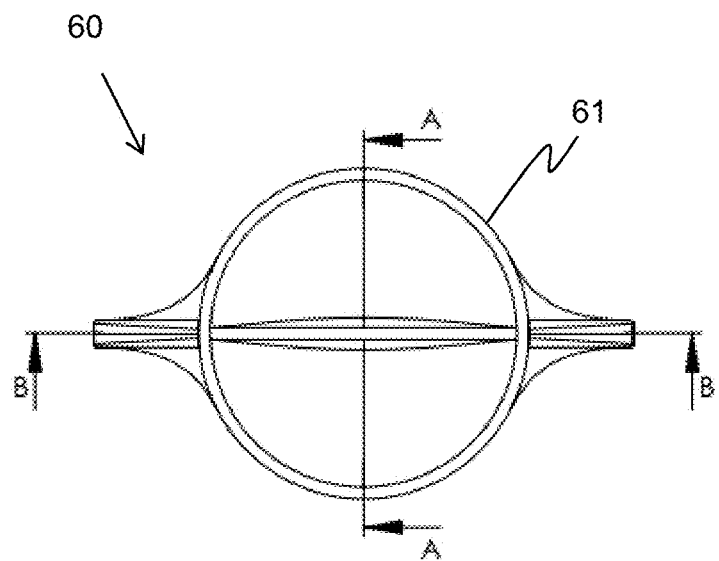
FIG. 9 is a cross-sectional view of the example valve of FIG. 8.
Figure 10:
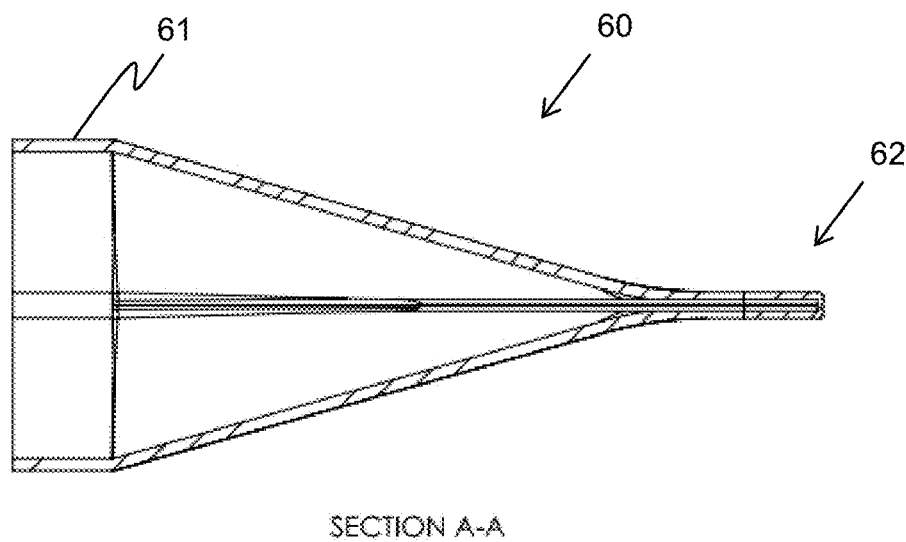
FIG. 10 is a cross-sectional view of the example valve of FIGS. 8 and 9 taken along section A-A.
Figure 11:
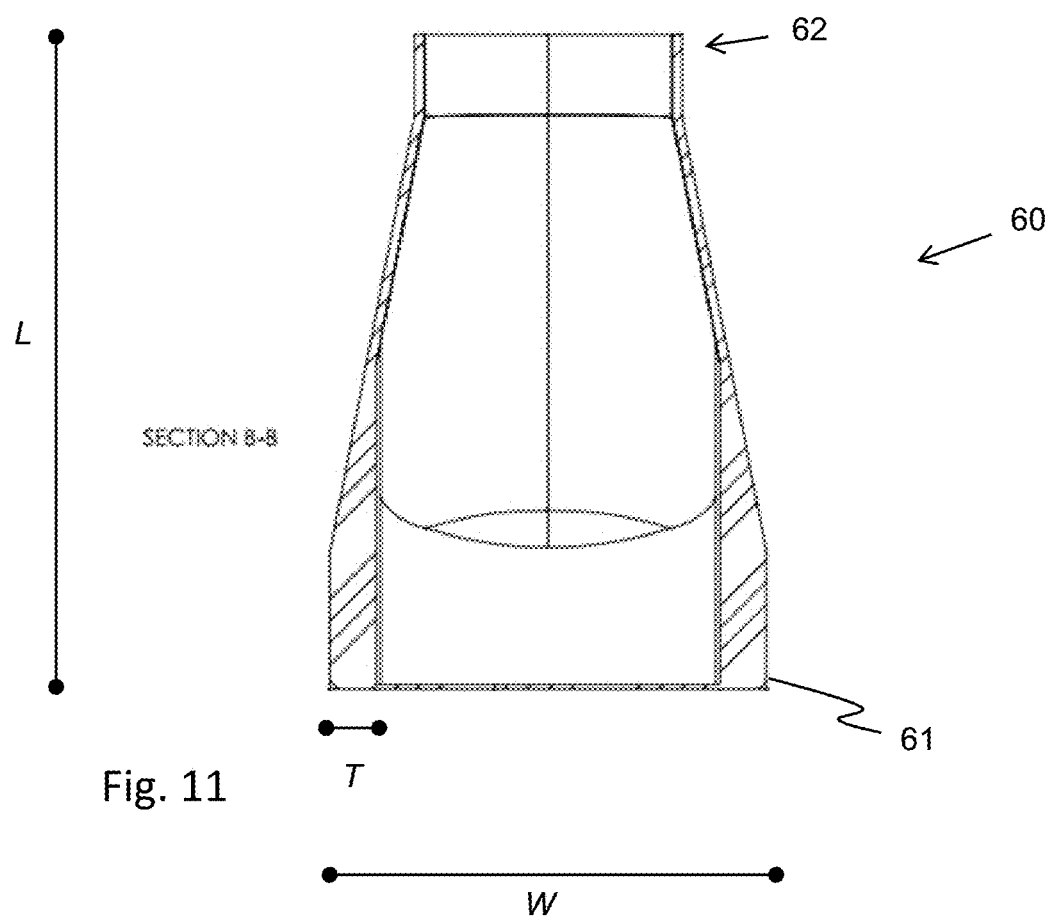
FIG. 11 is a cross-sectional view of the example valve of FIGS. 8, 9 and 10 taken along section B-B.

It will be appreciated that the valve may take many different forms. One example valve mechanism is, however, illustrated in FIGS. 6 and 7. In particular, FIGS. 6 and 7 show a distributor 43 comprising a valve 45, a vent 47 and an extractor 48. The valve 45 is formed by a tube 46 made of a resilient material such as a rubber (e.g. a polyurethane-based rubber). The tube 46 is shaped such that the tube tapers closed at the distribution end 49 in a default closed configuration (as shown in FIG. 6). When in the closed configuration, granular material 50 is unable to pass through the tube 46 and exit the distributor 43. However, the valve 45 is also operable in an open configuration (as shown in FIG. 7) in which the tapered end of the tube 46 is stretched open at the distribution end 49 to permit granular material 50 to exit the distributor 43. Since the tube 46 is made of a resilient material such as a rubber, the tapered end of the tube 46 opens when the amount of granular material 50 immediately upstream thereof exceeds a threshold. In particular, the tapered end of the tube 46 opens when the force exerted by the granular material 50 (typically through the weight of the granular material 50) on the tapered end of the tube 46 is sufficiently large to stretch opposing walls apart.

The skilled person will appreciate that a tube 46 integrally formed from the resilient material (e.g. rubber, for example polyurethane-based rubber) can be manufactured by injection moulding, i.e. by forcing molten resilient material (e.g. rubber, for example polyurethane-based rubber) into a mould (e.g. a steel mould).

Since the distributor 33 comprises an extractor 48 which draws air out of the flow of granular material upstream of the valve 45, there is negligible air pressure acting on the tapered end of the tube 46 which might cause it to open. Accordingly, the valve 45 typically only opens under the weight of the granular material which has built up against the tapered end of the tube 46, particularly when this portion of the distributor 43 is held substantially vertically, i.e. such that arrow 51 points substantially vertically downwards.

FIGS. 8 to 11 illustrate an example valve design in more detail. In particular, a valve 60 is formed from a tube 61 of resilient material, such as a rubber. The tube 61 is flattened at a downstream distribution end 62 in such a way that it is biased closed at said distribution end 62 but openable against the bias when sufficient force is applied (i.e. by the weight of granular material acting internally against the distribution end 62 when in use).

Figure 12:
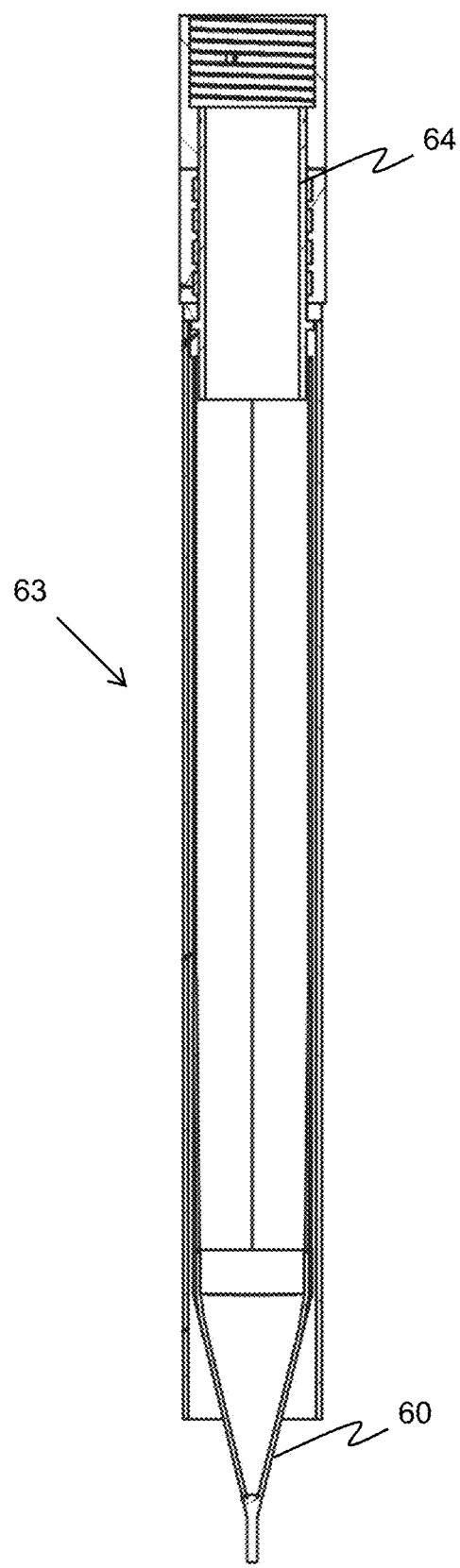
FIG. 12 is a cross-sectional view of an example distributor having a valve.
Figure 13:
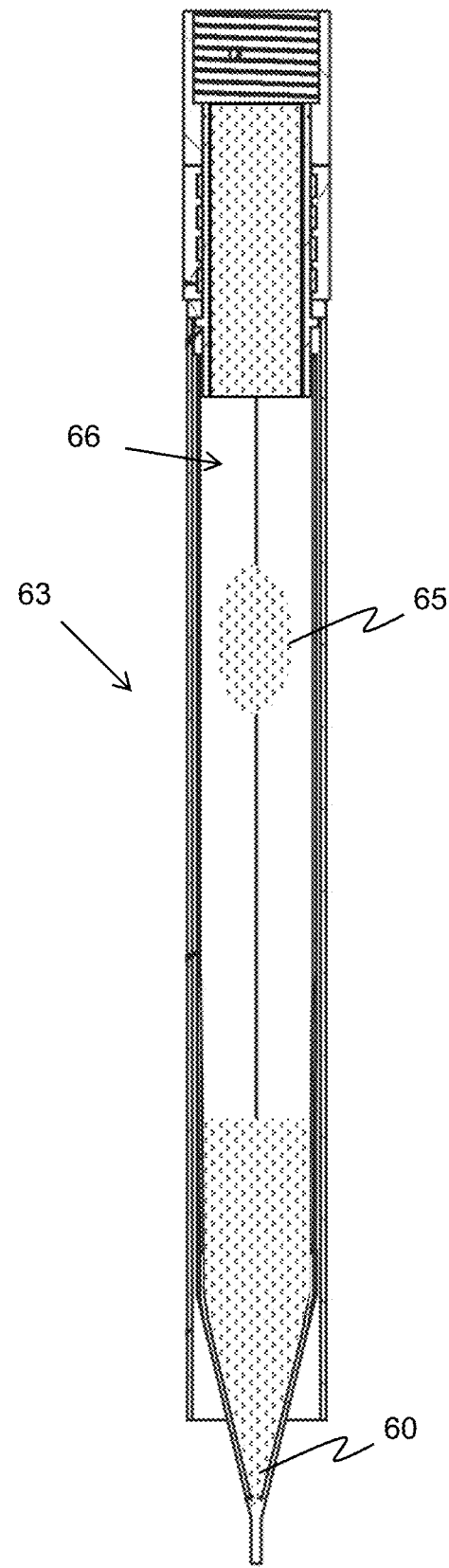
FIG. 13 is a cross-sectional view of the example distributor of FIG. 12 when in use when the valve is in the closed configuration.
Figure 14:
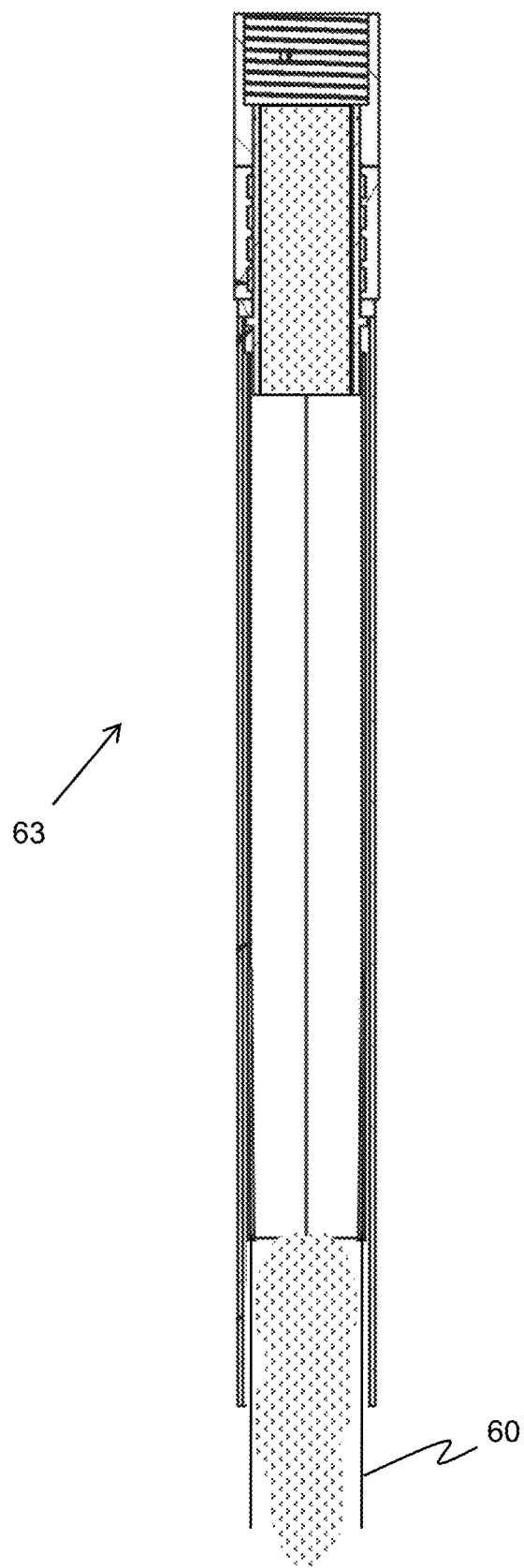
FIG. 14 is a cross-sectional view of the example distributor of FIGS. 12 and 13 in use when the valve is in the open configuration.

A nozzle portion of an example distributor 63 including the valve 60 is shown in FIGS. 12, 13 and 14. FIG. 12 illustrates the nozzle before use and FIGS. 13 and 14 illustrate the nozzle during use. In use, a flow of granular material enters the nozzle through inlet 64. As the flow of granular material is discontinuous, discrete packets 65 of granular material enter the nozzle one at a time. Air is drawn out of the flow of granular material through the vent in the vent region indicated generally at 66 such that the air flow no longer exerts a force on the packets 65 of granular material within the nozzle 63 or on the valve 60. The packets 65 of granular material therefore travel towards the valve 60 under their residual momentum and under the influence of gravity. Dependent on the characteristics of the valve 60, the force exerted by the impact of a single packet 65 reaching the valve 60 may not cause the valve 60 to open. Instead, granular material may build up immediately upstream of the valve (as shown in FIG. 13). Alternatively, it may be that the force exerted by a single packet of granular material is sufficient to cause the valve 60 to open (for example, in examples in which the packets of granular material contain larger amounts of granular material and are therefore heavier). In any case, however, it is only when the weight of the granular material acting against the valve 60 exceeds a threshold (which, it will be understood, is dependent on the dimensions of the valve and the characteristics, such as the density and hardness, of the resilient material from which the valve is formed) that the valve opens and the granular material is permitted to fall out of the nozzle, primarily under the influence of gravity, as shown in FIG. 14. Since the granular material falls out of the nozzle, rather than being blown out of the nozzle by gas pressure, there is a significant reduction in the amount of dust generated.

In some examples, the nozzle 63 also includes a distribution end vent located proximate the distribution end of the nozzle and through which the extractor draws air. Accordingly, dust which is generated as granular material exits the nozzle can also be collected by the distributor, further reducing the total amount of dust generated in the surrounding environment.

As mentioned hereinabove, the threshold weight of granular material which must be exceeded before the valve 60 opens depends on the dimensions of the valve 60 and the characteristics of the material from which it is formed. The inventors have found that an elastomeric material such as a rubber (e.g. a polyurethane-based rubber) is suitable for forming the valve 60. In particular, the inventors have found that an elastomeric material (such as a rubber, for example polyurethane-based rubber) having a density from about 30 kg/m$^3$ to about 70 kg/m$^3$ and a Shore A hardness from about 50 to about 95 (and particularly from about 60 to about 80) is suitable for use when distributing quartzite powder having a bulk density of about 2.2 t/m$^3$ (wherein "t" is a metric tonne, i.e. such that the bulk density of the quartz powder is about 2200 kg/m$^3$) and a packet size of about 700 g. The skilled person will appreciate that different materials may be selected dependent on the characteristics (e.g. density and/or particle size) of the granular material to be distributed and/or the characteristics of the volume packets output by the granular material feeder (e.g. the amount of granular material in each volume packet and/or the rate at which volume packets are output by the granular material feeder).

In the example shown in FIGS. 8 to 11, the length L of the tube 61 is about 133 mm, the width W is about 89 mm and the thickness T of the elastomeric material tube wall at the upstream end is about 19 mm. However, again the skilled person will appreciate that different valve dimensions may be selected dependent on the characteristics (e.g. density and/or particle size) of the granular material to be distributed and/or the characteristics of the volume packets output by the granular material feeder (e.g. the amount of granular material in each volume packet and/or the rate at which volume packets are output by the granular material feeder). For example, the length of the tube may be from about 50 mm to about 150 mm, the width may from about 40 mm to about 120 mm and the thickness of the material at the upstream end may be from about 10 mm to about 30 mm.

Figure 15:
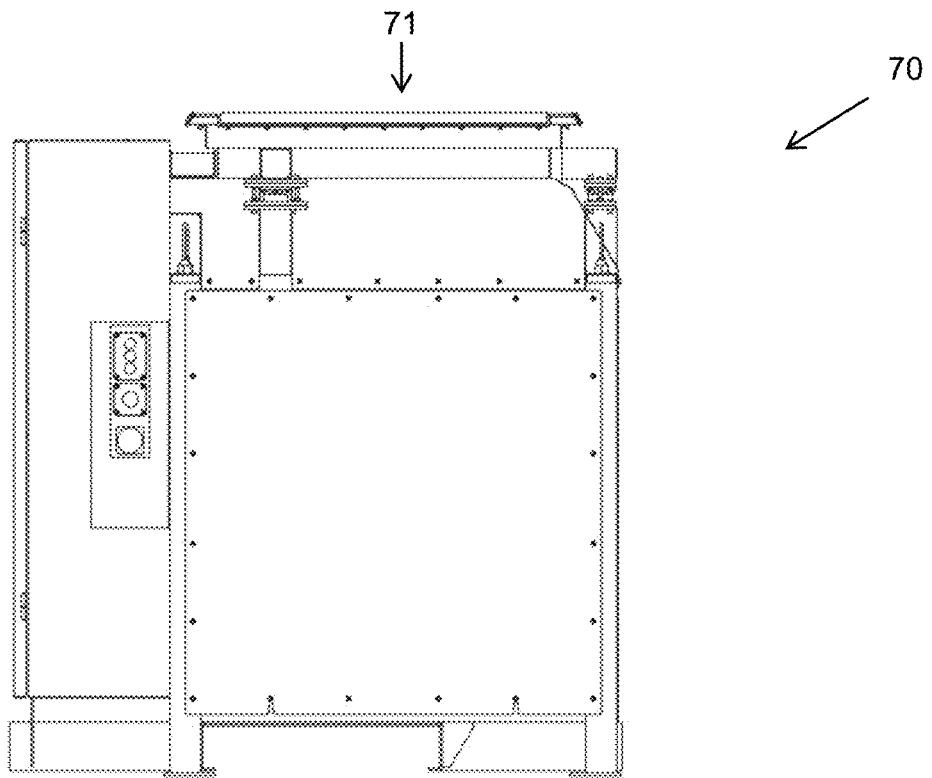
FIG. 15 is a side view of an example granular material pump assembly.
Figure 16:
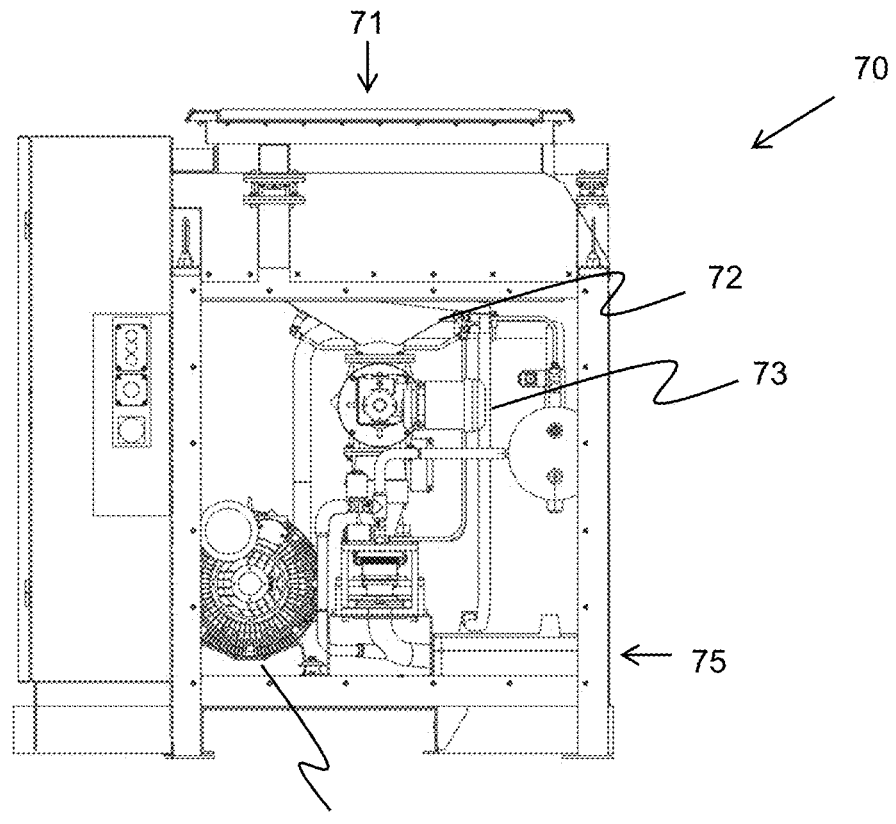
FIG. 16 is a cross-sectional view of the granular material pump assembly of FIG. 15.
Figure 17:
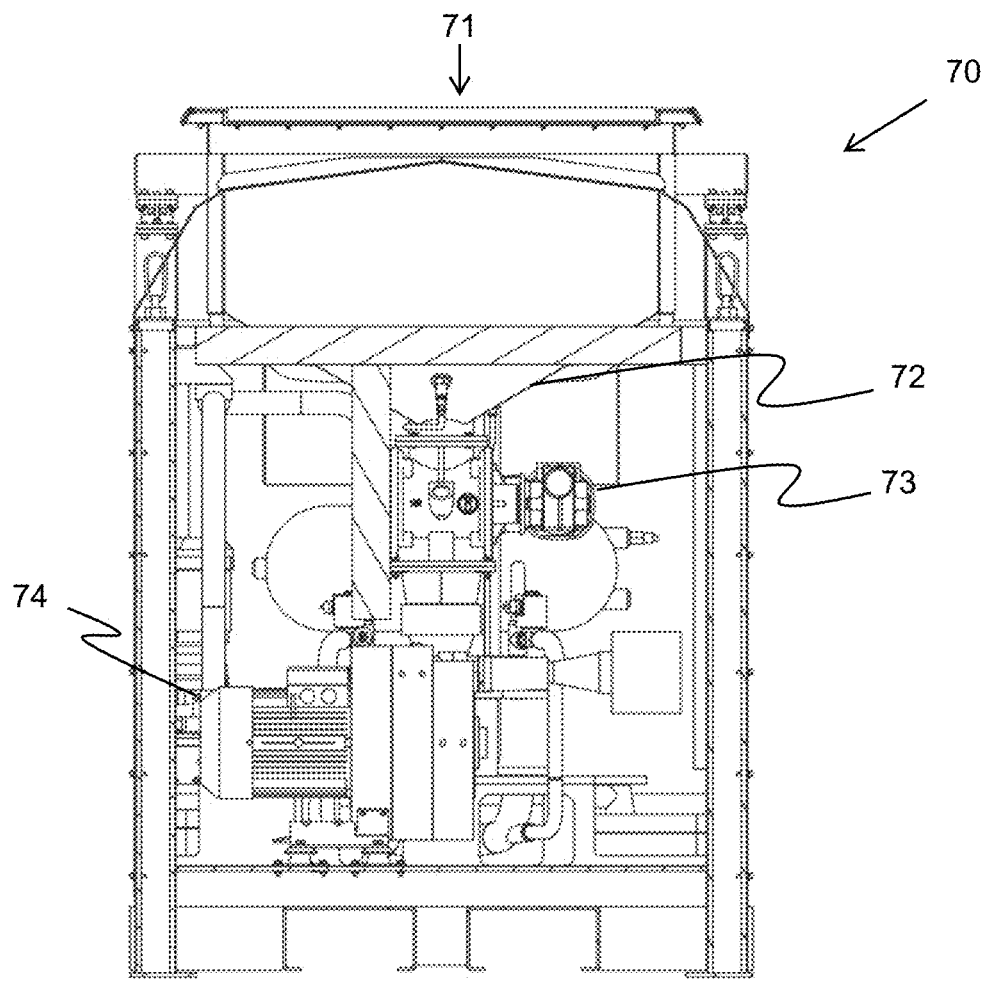
FIG. 17 is a cross-sectional view of the granular material pump assembly of FIGS. 15 and 16, the cross-section in FIG. 17 being taken in a plane perpendicular to the cross-sectional plane of FIG. 16.
Figure 18:
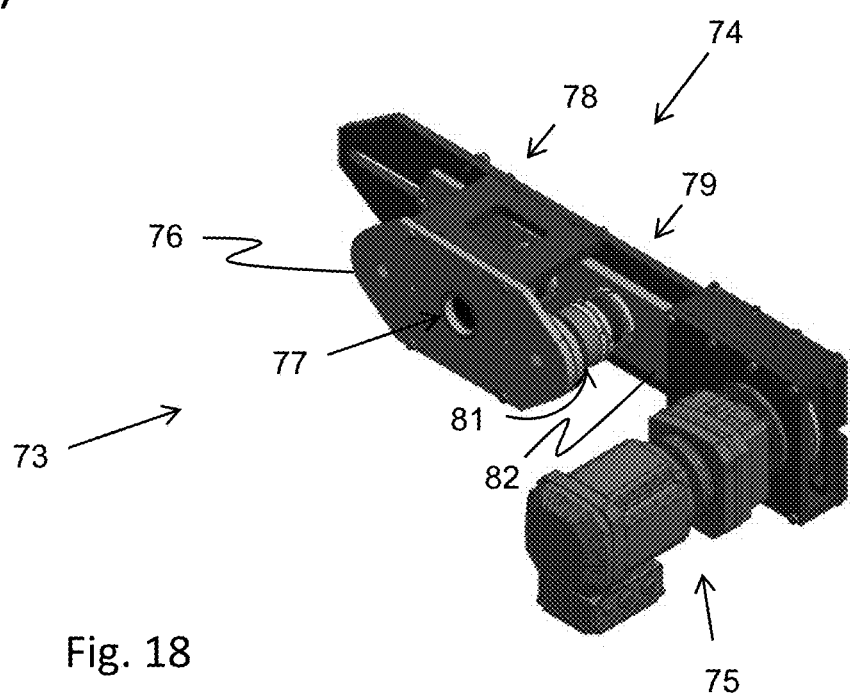
FIG. 18 is a perspective view of a discontinuous granular material feeder.
Figure 19:
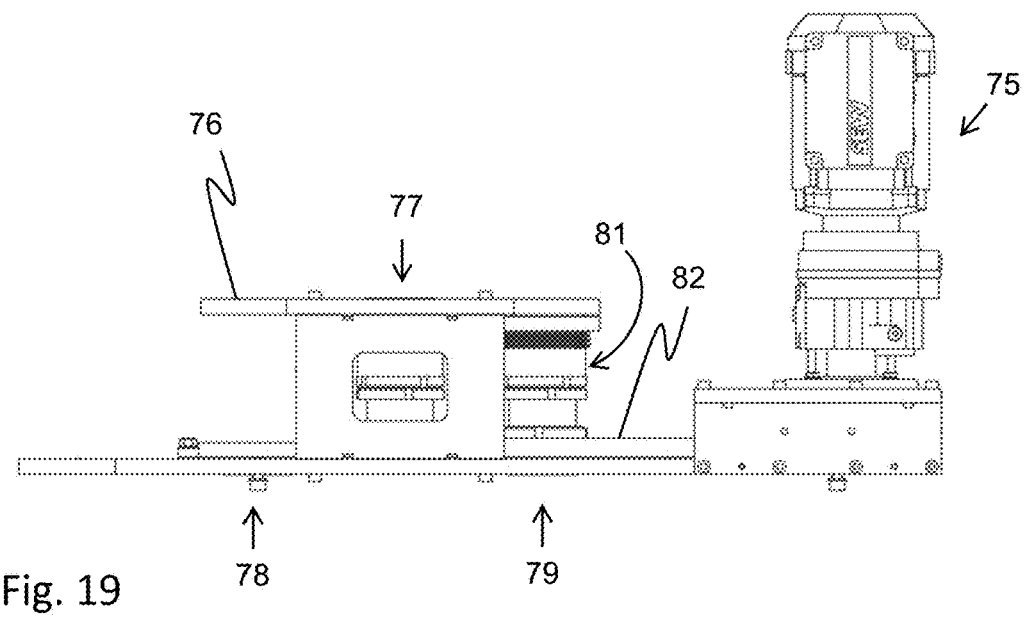
FIG. 19 is a side view of the discontinuous granular material feeder of FIG. 18.
Figure 20:
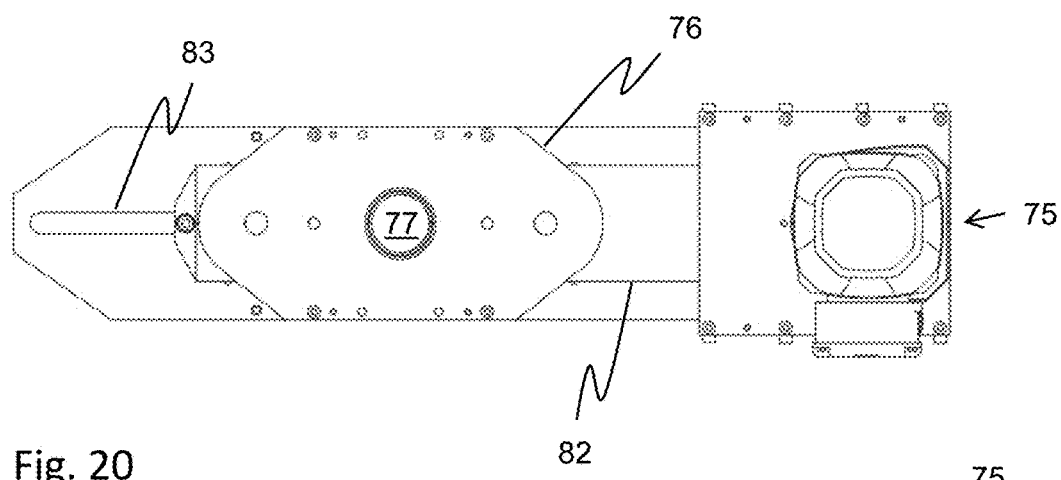
FIG. 20 is a plan view of the discontinuous granular material feeder of FIGS. 18 and 19.
Figure 21:
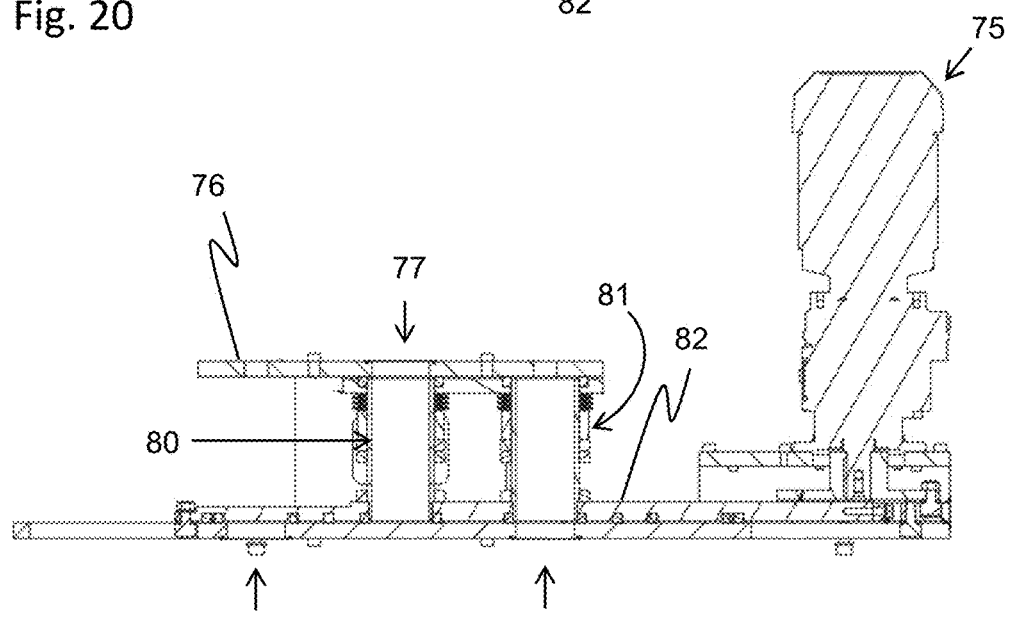
FIG. 21 is a cross-sectional view of the discontinuous granular material feeder of FIGS. 18, 19 and 20.

An example pumping apparatus 70 is illustrated in FIGS. 15 to 17. The pumping apparatus 70 includes a granular material inlet 71, a first granular material feeder 72, a second granular material feeder 73, an air flow generator 74 and an outlet 75 for connection to a distributor. The granular material inlet 71 may include a bag splitter for splitting open a bag of granular material placed in the inlet 71. The first granular material feeder 72 is a continuous granular material feeder configured to continuously feed granular material received at the inlet into the second granular material feeder 73, which is in turn a discontinuous granular material feeder configured to output a discontinuous flow of granular material to the outlet 75 by way of the air flow generator 74, which generates a flow of air for pumping the discontinuous flow of granular material out of the outlet 75 and into and along the distributor when in use.

The discontinuous granular material feeder 73 is shown in more detail in FIGS. 18 to 21. The feeder 73 includes a feeding assembly 74 and an actuator 75 comprising a motor. The feeding assembly 74 includes a frame 76 which defines an inlet aperture 77 for receiving a flow of granular material from the first granular material feeder 72 and two outlet apertures 78 and 79, spaced apart from one another, for outputting a discontinuous flow of granular material. The feeding assembly 74 also includes first and second granular material conduit portions 80 and 81 mounted to a support 82. The support 82 is slidably mounted within the frame 76 by way of groove 83 and is coupled to the actuator 75. The actuator 75 is operable to drive sliding motion of the support 82 back and forth along the groove 83, thereby causing the first and second granular material conduit portions 80 and 81 to reciprocate within the frame 76. The first and second granular material conduit portions 80 and 81 are therefore alternately brought in and out of alignment with the inlet aperture 77 and the outlet apertures 78 and 79. In particular, when one of the first and second granular material conduit portions 80 and 81 is aligned with the inlet aperture 77, the said one of the first and second granular material conduit portions 80 and 81 can be filled with granular material flowing through the inlet aperture 77. At the same time, the other of the first and second granular material conduit portions 80 and 81 is aligned with one of the outlet apertures 78 and 79 and granular material can therefore flow out of the said other of the first and second granular material conduit portions 80 and 81 through the said outlet aperture. As the first and second granular material conduit portions 80 and 81 move back and forth within the frame 76, the first and second granular material conduit portions 80 and 81 are alternately charged with, and discharge, granular material. As there is a delay between successive discharges of granular material through the outlets 78 and 79, the feeder 73 generates a discontinuous (i.e. periodic) output of granular material from a continuous input flow. This discontinuous output comprises a series of discrete volumes of granular material output by the feeder 73 separated by periods of time during which no granular material is output by the feeder 73. The periodicity of the output is determined in part by the volume of each of the first and second granular material conduit portions 80 and 81 and by the rate at which conduit portions 80 and 81 reciprocate within the frame. In some examples, the feeder 73 is configured to output a discrete volume of granular material (i.e. corresponding to the volume of granular material retained by a fully-charged granular material conduit portion) every 0.2 to 10 seconds, for example about every 1 second (or about every 1.3 seconds).

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A pumping apparatus comprising:
    a granular material pump assembly and
    a distributor having a distribution end, wherein the granular material pump assembly is configured to pump granular material through the distributor towards the distribution end, and the distributor is configured to permit granular material to exit the distributor at the distribution end responsive to an amount of granular material pumped towards the distribution end exceeding a threshold.

2. The pumping apparatus according to claim 1, wherein the granular material pump assembly comprises a granular material feeder.

3. The pumping apparatus according to claim 2, wherein the distributor further comprises a valve and a vent and the vent is configured to vent gas from the flow of granular material in the distributor.

4. The pumping apparatus according to claim 3, wherein the valve is configured to open responsive to the amount of granular material in the vent region exceeding the threshold.

5. The pumping apparatus according to claim 2, wherein the granular material pump assembly is configured to pump discrete volumes of granular material through the distributor towards the distribution end, the discrete volumes of granular material being spaced apart from one another within the distributor.

6. The pumping apparatus according to claim 1, wherein the granular material pump assembly comprises first and second granular material feeders, the first granular material feeder being a continuous feeder and the second granular material feeder being a discontinuous feeder, wherein
- the first granular material feeder is configured to feed granular material into the second granular material feeder and
- the second granular material feeder is configured to regulate a flow of granular material into the distributor.

7. The pumping apparatus according to claim 4, wherein the valve is biased towards a closed configuration in which passage of granular material therethrough is restricted, the valve being configured to open against the bias to permit passage of granular material therethrough responsive to the amount of granular material pumped towards the distribution end exceeding the threshold.

8. The pumping apparatus according to claim 7, wherein the valve comprises a tube made of a resilient material, the tube being biased closed at a downstream end.

9. The pumping apparatus according to claim 1, wherein the distributor comprises a hose and a nozzle for distributing the granular material, the nozzle being located at the distribution end.

10. A granular material feeder operable to generate a discontinuous output flow of granular material from a continuous input flow of granular material,
- wherein the discontinuous output flow comprises discrete volumes of granular material output periodically by the granular material feeder, and
- wherein the granular material feeder comprises:
- at least one inlet for receiving the continuous input flow of granular material;
- at least one outlet for outputting the discontinuous output flow of granular material;
- a granular material flow conduit movable between:
- a charging configuration, in which the granular material flow conduit is aligned with an inlet for receiving granular material; and
- a discharging configuration, in which the granular material flow conduit is aligned with an outlet for discharging granular material; and
- an actuator configured to drive periodic movement of the granular material flow conduit between the charging and discharging configurations.

11. The granular material feeder according to claim 10, wherein the granular material feeder comprises two or more granular material flow conduits each being movable between respective charging and discharging configurations with respect the at least one inlet and the least one outlet, and wherein the actuator is configured to drive periodic movement of the two or more granular material flow conduits between the respective charging and discharging configurations.

12. A pumping apparatus comprising the granular material feeder according to claim 10.

13. A method comprising using the pumping apparatus according to claim 12 to pump a granular refractory material.

14. The pumping apparatus according to claim 8, wherein the tube is flattened at the downstream end in the closed configuration.

15. The pumping apparatus according to claim 8, wherein the resilient material is an elastomeric material.

16. The pumping apparatus according to claim 8, wherein the threshold is at least in part determined by the dimensions of the tube and/or the mechanical properties of the resilient material.

17. A pumping apparatus comprising:
- a granular material pump assembly and a distributor having a distribution end for distributing granular material, wherein:
- the granular material pump assembly is configured to pump granular material through the distributor towards the distribution end, the distributor comprises a valve assembly having a valve configured to open to permit granular material to exit the distributor at the distribution end responsive to an amount of granular material pumped towards the distribution end exceeding a threshold,
- the granular material pump assembly comprises a granular material feeder for regulating a flow of granular material into the distributor and a gas flow generator for pumping the flow of granular material through the distributor, and
- the valve assembly comprises a vent configured to vent gas from the flow of granular material in the distributor in a vent region upstream of the valve.

18. A method comprising using the pumping apparatus according to claim 17 to pump a granular material.

* * * * *